United States Patent [19]

Burger

[11] Patent Number: 5,555,325
[45] Date of Patent: Sep. 10, 1996

[54] DATA CAPTURE VARIABLE PRIORITY METHOD AND SYSTEM FOR MANAGING VARYING PROCESSING CAPACITIES

[75] Inventor: Mark E. Burger, Germantown, Md.

[73] Assignee: Lockheed Martin Federal Systems, Inc., McLean, Va.

[21] Appl. No.: 142,256

[22] Filed: Oct. 22, 1993

[51] Int. Cl.$^6$ .............................. G06K 9/03; G06F 15/00
[52] U.S. Cl. ...................... 382/309; 382/311; 395/158; 395/146
[58] Field of Search ................. 382/61, 57, 41, 382/309, 311, 305, 175, 180; 395/144, 145, 148, 158, 146

[56] References Cited

U.S. PATENT DOCUMENTS

| | | | |
|---|---|---|---|
| 4,503,556 | 3/1985 | Scherl et al. | 382/9 |
| 4,533,959 | 8/1985 | Sakurai | 358/280 |
| 4,741,045 | 4/1988 | Denning | 382/9 |
| 4,748,678 | 5/1988 | Takeda et al. | 382/56 |
| 4,914,571 | 4/1990 | Baratz et al. | 364/200 |
| 4,933,979 | 6/1990 | Suzuki et al. | 382/61 |
| 4,933,984 | 6/1990 | Nakano et al. | 382/61 |
| 4,949,392 | 8/1990 | Barski et al. | 382/61 |
| 5,228,100 | 7/1993 | Takeda et al. | 382/48 |
| 5,235,654 | 8/1993 | Anderson et al. | 382/61 |
| 5,251,273 | 10/1993 | Betts et al. | 382/61 |
| 5,257,323 | 10/1993 | Melon et al. | 382/57 |
| 5,305,396 | 4/1994 | Betts et al. | 382/61 |

FOREIGN PATENT DOCUMENTS

WO90/15398  5/1990  WIPO .............. G06K 9/03

OTHER PUBLICATIONS

IBM Technical Disclosure Bulletin, H. Aghili, et al., "Converting Paper Document to Electronic Images With Automatic Document . . . ," vol. 34, Mar. 1992; pp. 435–439.

H. E. Lower, W. S. Rohland and P. J. Traglia, IBM Technical Disclosure Bulletin, "Field Skipping Function:" Mar. 1971, p. 2893.

*Primary Examiner*—Jose L. Couso
*Assistant Examiner*—Matthew C. Bella
*Attorney, Agent, or Firm*—John E. Hoel; William H. Steinberg

[57] ABSTRACT

A data processing system and method manages the recognition of text characters in a plurality of document images. The documents are predefined forms having a plurality of fields in which text characters are to be recognized. A form definition data set is used to specify various characteristics of the fields on the form such as their locations. A data capture priority value is specified in the form definition data set for at least some of the fields. This priority is used to manage the workload of the character recognition process. When a large number of document form images have been received by the system, they can limit the backlog volume and maintain a desired throughput for character recognizing the forms by reducing the number of fields which are character recognized on each form. By using the data capture priority value for each field, the character recognition processor can be controlled to omit processing or perform faster, lower-quality processing of low priority fields.

9 Claims, 25 Drawing Sheets

FIG. 6

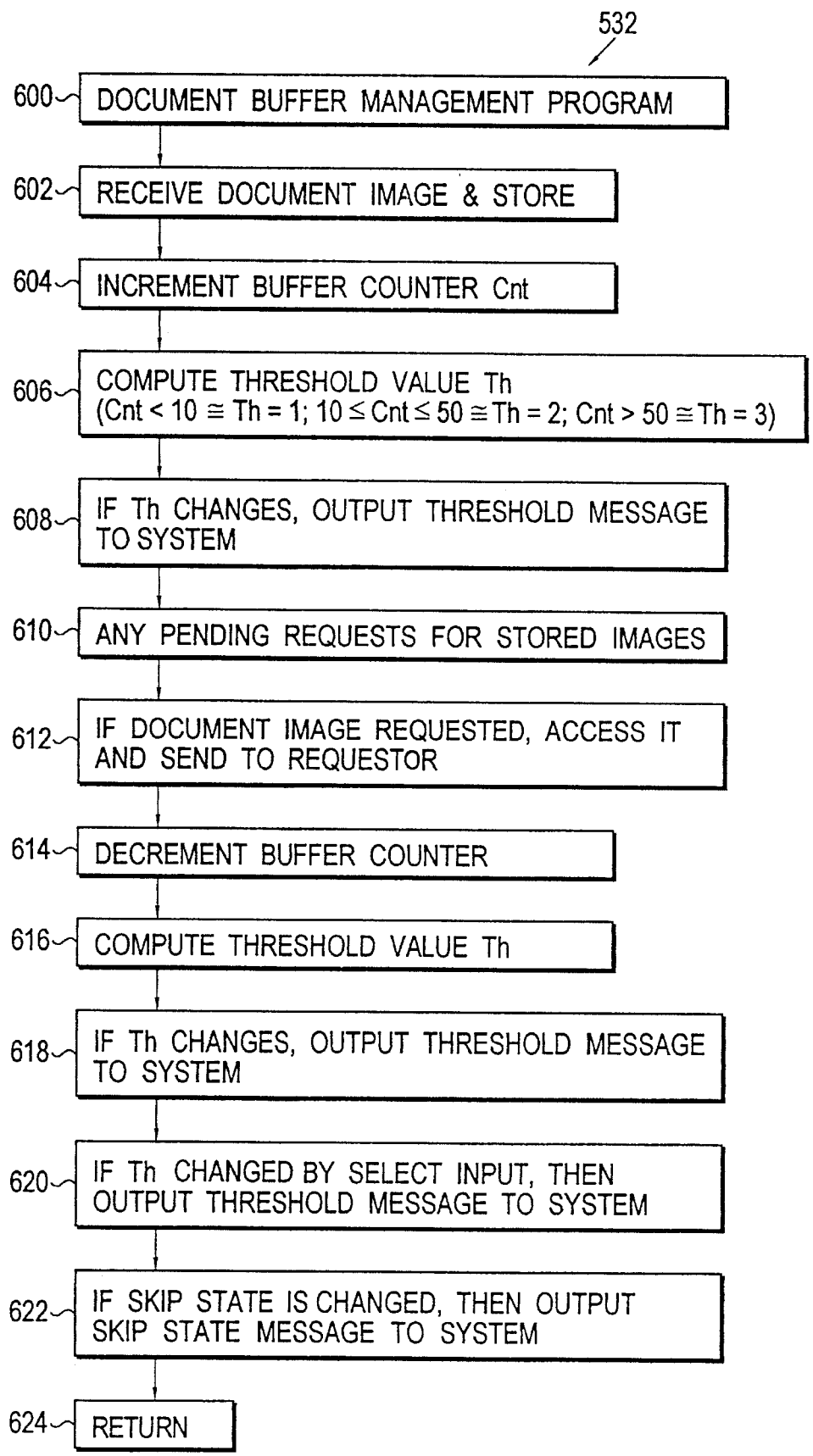

- 600 — DOCUMENT BUFFER MANAGEMENT PROGRAM
- 602 — RECEIVE DOCUMENT IMAGE & STORE
- 604 — INCREMENT BUFFER COUNTER Cnt
- 606 — COMPUTE THRESHOLD VALUE Th ($Cnt < 10 \cong Th = 1$; $10 \leq Cnt \leq 50 \cong Th = 2$; $Cnt > 50 \cong Th = 3$)
- 608 — IF Th CHANGES, OUTPUT THRESHOLD MESSAGE TO SYSTEM
- 610 — ANY PENDING REQUESTS FOR STORED IMAGES
- 612 — IF DOCUMENT IMAGE REQUESTED, ACCESS IT AND SEND TO REQUESTOR
- 614 — DECREMENT BUFFER COUNTER
- 616 — COMPUTE THRESHOLD VALUE Th
- 618 — IF Th CHANGES, OUTPUT THRESHOLD MESSAGE TO SYSTEM
- 620 — IF Th CHANGED BY SELECT INPUT, THEN OUTPUT THRESHOLD MESSAGE TO SYSTEM
- 622 — IF SKIP STATE IS CHANGED, THEN OUTPUT SKIP STATE MESSAGE TO SYSTEM
- 624 — RETURN

FIG. 9A

```
DEFINITION DATA - FORM X
FIELD A - PRIORITY = 1
FIELD B - PRIORITY = 2
FIELD C - PRIORITY = 3
```
— 902

FIG. 9B

```
DEFINITION DATA - FORM Y
FIELD A - PRIORITY = 3
FIELD B - PRIORITY = 1
```
— 904

FIG. 9C

```
DEFINITION DATA - FORM Z
FIELD A - PRIORITY = 3
FIELD B - PRIORITY = 2
FIELD C - PRIORITY = 1
```
— 906

FIG. 9D

```
THRESHOLD MESSAGE
Th = 1
SKIP = 0
```
— 908

FIG. 9E

```
┌─────────────────────┐
│ FORM X              │
├─────────────────────┤
│ FIELD A - ABCD      │
│                     │
│ FIELD B - EFGH      │
│                     │
│ FIELD C - IJKL      │
└─────────────────────┘
```
— 910

FIG. 9F

```
┌─────────────────────┐
│ FORM Y              │
├─────────────────────┤
│ FIELD A - A'B'C'D'  │
│                     │
│ FIELD B - E'F'G'H'  │
└─────────────────────┘
```
— 912

FIG. 9G

```
┌─────────────────────┐
│ FORM Z              │
├─────────────────────┤
│ FIELD A - A"B"C"D"  │
│                     │
│ FIELD B - E"F"G"H"  │
│                     │
│ FIELD C - I"J"K"L"  │
└─────────────────────┘
```
— 914

FIG. 12B
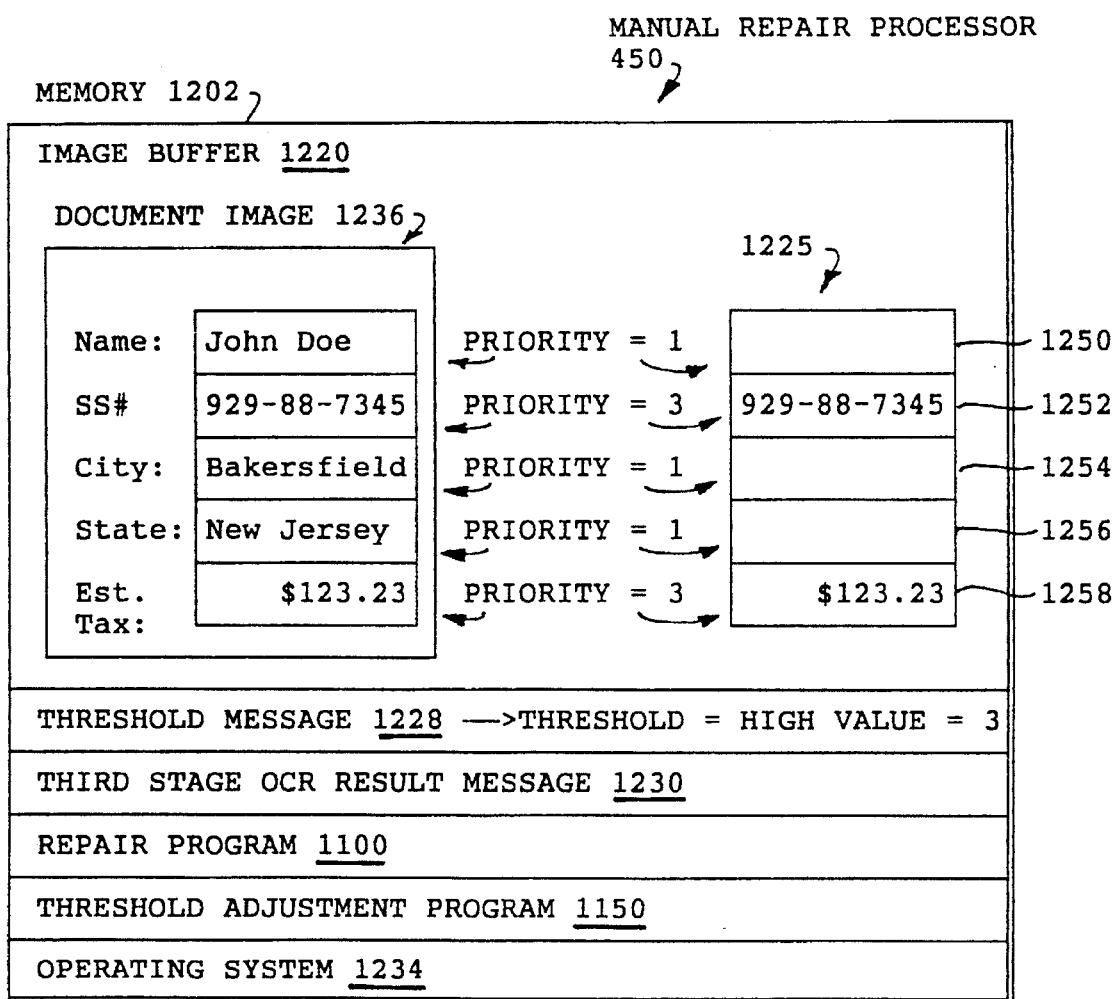
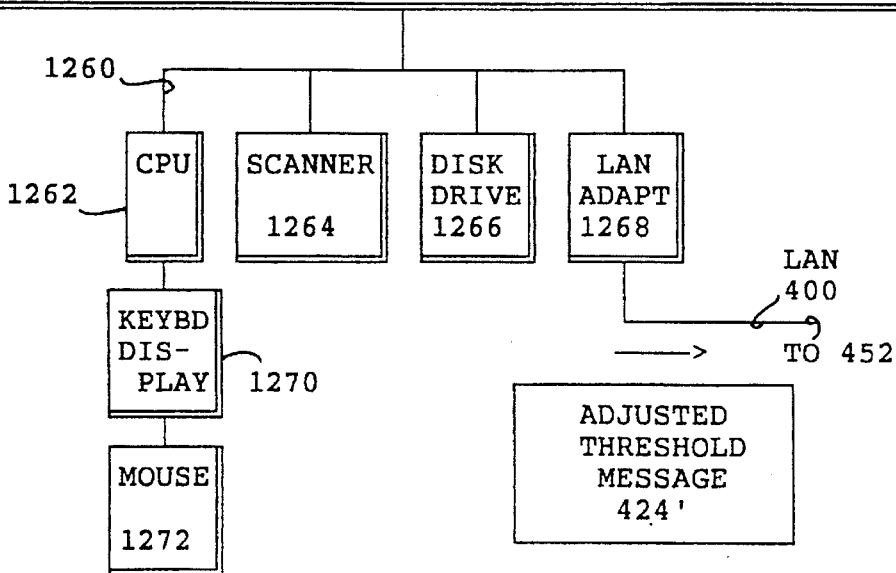

DATA CAPTURE VARIABLE PRIORITY METHOD AND SYSTEM FOR MANAGING VARYING PROCESSING CAPACITIES

BACKGROUND OF THE INVENTION

1. Technical Field

The invention disclosed broadly relates to data processing and more particularly relates to character recognition of document forms.

2. Related Patents and Patent Applications

This patent application is related to the copending U.S. patent application, Ser. No. 07/870,129, filed Apr. 15, 1992, entitled "Data Processing System and Method for Sequentially Repairing Character Recognition Errors for Scanned Images of Document Forms," by T. S. Betts, et al., the application being assigned to the IBM Corporation and incorporated herein by reference.

This patent application is also related to the copending U.S. patent application, Ser. No. 07/870,507, filed Apr. 17, 1992, entitled "Data Processing System and Method for Selecting Customized Character Recognition Processes and Coded Data Repair Processes for Scanned Images of Document Forms," by T. S. Betts, et al., the application being assigned to the IBM Corporation and incorporated herein by reference.

This patent application is also related to U.S. Pat. No. 5,140,650, Ser. No. 07/305,828, entitled "A Computer Implemented Method for Automatic Extraction of Data From Printed Forms," by R. G. Casey, et al., the patent being assigned to the IBM Corporation and incorporated herein by reference.

This patent application is also related to the copending U.S. patent application, Ser. No. 08/051,972, filed Apr. 26, 1993, entitled "System and Method for Enhanced Character recognition Accuracy by Adaptive Probability Weighting," by M. P. T. Bradley, the application being assigned to the IBM Corporation and incorporated herein by reference.

This patent application is also related to the copending U. S. patent application by D. W. Billings, et al. entitled "Method for Defining a Plurality of Form Definition Data Sets," Ser. No. 08/100,846, filed Aug. 2, 1993, the application being assigned to the IBM Corporation and incorporated herein by reference.

3. Background Art

Data contained in digitized images can be extracted for a number of purposes, and in many different ways. A prerequisite for extracting information from a form is a knowledge of the types and locations of the data (information about the "fields" of the form). Currently, most forms processing applications have their own method for "defining" forms, and each method is incompatible with the others. In large image systems which use several different forms processing applications, each form needs to be separately defined for each application, which costs time and introduces inconsistencies in the form definitions. The method disclosed in the copending D. W. Billings, et al. patent application creates form definition data sets which can be used for almost any forms processing application.

In many business applications, the volume of forms to be processed can vary widely with time. When a large number of document form images are received by the system in a short interval, it can drastically increase the time required for character recognizing the forms.

OBJECTS OF THE INVENTION

It is therefore an object of the invention to manage the recognition of text characters in a plurality of document images, in an improved manner.

It is another an object of the invention to use a predetermined assessment of the relative importance of particular fields of a document form, to manage the throughput for character recognition processing of a plurality of such forms.

It is another object of the invention to manage the repair of misrecognized characters output from the character recognition machines, in an improved manner.

SUMMARY OF THE INVENTION

These and other objects, features and advantages are accomplished by the invention disclosed herein. A data processing system and method are disclosed, for managing the recognition of text characters in a plurality of document images. The documents are predefined forms having a plurality of fields in which text characters are to be recognized. A form definition data set is used to specify various characteristics of the fields on a form, such as their location.

In many business applications, the information in some fields of a form is less important than that in other fields. In accordance with the invention, a data capture priority value is specified in the form definition data set for at least some of the fields. This priority is used to manage the workload of the character recognition process. When a large number of document form images are received by the system in a short interval, it can maintain a desired throughput for character recognizing the forms, by reducing the number of fields which are character recognized on each form. By using the data capture priority value for each field, the character recognition processor can be controlled to omit processing low priority fields. Later, when the buffered volume of unprocessed form images is reduced, the recognition process can resume performing character recognition on the low priority fields.

The method of the invention can be applied in a data processing system, including a document image input, a document image buffer, and a character recognition processing means. The method will typically be implemented by executing a computer program in the data processing system. The major steps of the method include storing the field definition data set for a first field definition in the system, specifying a first location and a first priority value for a first field in a document form and a second field definition in the system, specifying a second location and a second priority value for a second field, which is less than the first priority value. The method then performs the step of buffering in the document image buffer, a plurality of document images of the document form, containing text characters in the first and second fields. The method then maintains a count of the plurality of buffered document images in the document image buffer and sends a threshold signal to the character recognition processing means if the plurality is greater than a predetermined value.

The method then manages the work flow of character recognition by performing character recognition of the first and second fields with the character recognition processing means when the plurality of buffered document images is less than the predetermined value and omitting performing character recognition of the second field with the character recognition processing means in accordance with the second field definition, in response to the threshold signal when the plurality of buffered document images is greater than the predetermined value.

In this manner, the invention manages the recognition of text characters in a plurality of document images, to maintain the throughput for processed documents, even though the volume of document images to process varies.

Another feature of the invention is the provision of multiple manual repair processors which adjust their operations in response to the number of workstations logged on to the system. A manual repair processor will receive field priorities for a particular document form type, along with system threshold and the document form image. It also receives OCR character recognition results for misrecognized and suspicious characters in the document image. In accordance with the invention, if the field priority for a particular field is greater than the threshold value, then the field is highlighted on the displayed image of the document and the alphanumeric string is displayed for that field and presented to the operator for manual repair. Alternately, if the field priority of a particular field is not sufficiently high when compared with the system threshold, then that particular field is not presented to the operator. In this manner, the overall throughput for the manual repair process is maintained relatively constant in the face of variations in the manpower available to perform the work.

Another feature of the invention is the provision of a local adjustment to the threshold for operating the manual repair processors, based upon the number of repair stations logged on to the system. When a local workstation logs on, it polls all of the workstations on the system to determine how many others are logged on. If the number logged on is less than a predetermined number, then the threshold value is set high. In this manner the manual repair processor ignores low priority fields and presents only high priority field for examination to the operator. Alternately, if the logged on number of workstations is greater than a predetermined number, then the threshold value is set low, thereby enabling the repair processor to present more of the fields on the document form to the operator, for the correction of misrecognized and suspicious OCR result characters.

DESCRIPTION OF THE FIGURES

These and other objects, features and advantages will be more fully appreciated with reference to the accompanying figures.

FIG. 6 is a flow diagram of the document buffer management program.

FIG. 9A illustrates a definition data set for Form X.

FIG. 9B illustrates a definition data set for Form Y.

FIG. 9C illustrates a definition data set for Form Z.

FIG. 9D illustrates a threshold message.

FIG. 9E illustrates Form X.

FIG. 9F illustrates Form Y.

FIG. 9G illustrates Form Z.

FIG. 11B is a flow diagram of the threshold adjustment process based on the number of repair workstations logged on.

FIG. 12B is a functional block diagram of the manual repair processor 450, with the threshold equal to a high value of three.

DISCUSSION OF THE PREFERRED EMBODIMENT

The invention is a system and method for managing the recognition of text characters in a plurality of document images. This management is achieved by assigning data capture priorities to various fields on a document form. By making use of these priorities when a high buffer volume of backlog documents is present, the less important fields can be ignored or deferred in their character recognition processing in favor of more important fields. In this manner, the overall document throughput for character recognition processing can be maintained in the face of widely varying volumes of document images to be processed.

Figure 1A:
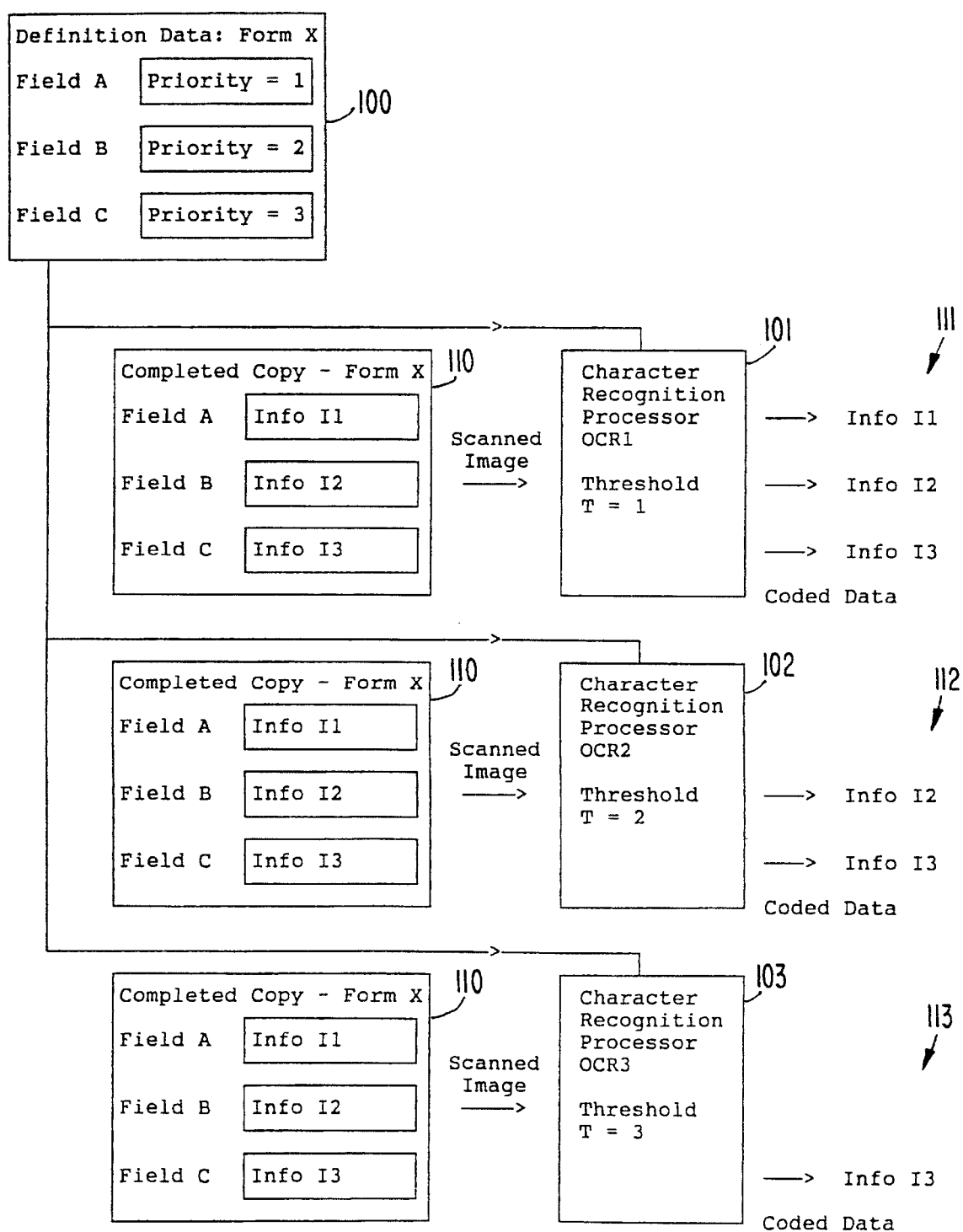
FIG. 1A is an organizational block diagram illustrating skipping fields based on field priority.

FIG. 1A illustrates a schematic block diagram of the application of the variable priority and the assignment of data capture priorities in the management of character recognition processing. A definition data set 100 for the Form X is applied to the three character recognition processors 101, 102 and 103, in the manner described in the above cited Billings, et al. patent application. The definition data set 100 includes a data capture priority value for each of the Fields A, B and C. Data capture priority values are assigned to individual fields in a document definition data set 100, based on the user's assessment of the relative importance of those fields to his line of business. In accordance with the invention, when a completed copy of Form X 110 is scanned into the system forming a digitized bit map image of the document, and when that document image is processed by each character recognition processor 101, 102 and 103, the output of the respective character recognition processors will be a function of the overall system threshold applied to each processor and the respective data capture priorities assigned to each respective field. For example, if the first character recognition processor 101 has a threshold value of one assigned to it, and if each of the Fields A, B and C has a priority of one or greater, then the information contained in each of the respective Fields A, B and C of the completed form 110 will be processed in the character recognition operations for the processor 101. This will result in all three of the fields being subjected to character recognition and having outputs provided as is shown at 111 in FIG. 1A. Instead, if a character recognition processor 102 has a threshold value of two assigned to it, then only those Fields B and C of the completed copy 110 which have a priority value of two or greater will be processed. Thus it is seen that the output of the character recognition processor 102 only includes the Field B and the Field C as shown at 112. Similarly, if a character recognition processor 103 has a threshold value of three assigned to it, then only those Fields C having a priority value of three or greater will be processed. Thus it is seen that only information for Field C in the completed copy 110 will be processed and output at 113 of FIG. 1A. The threshold values assigned to processors 101, 102 and 103 are derived from a measure of the volume of backlogged document images 110 waiting to be processed. These threshold values may be automatically assigned or they may be input by a system administrator or operator.

Figure 1B:
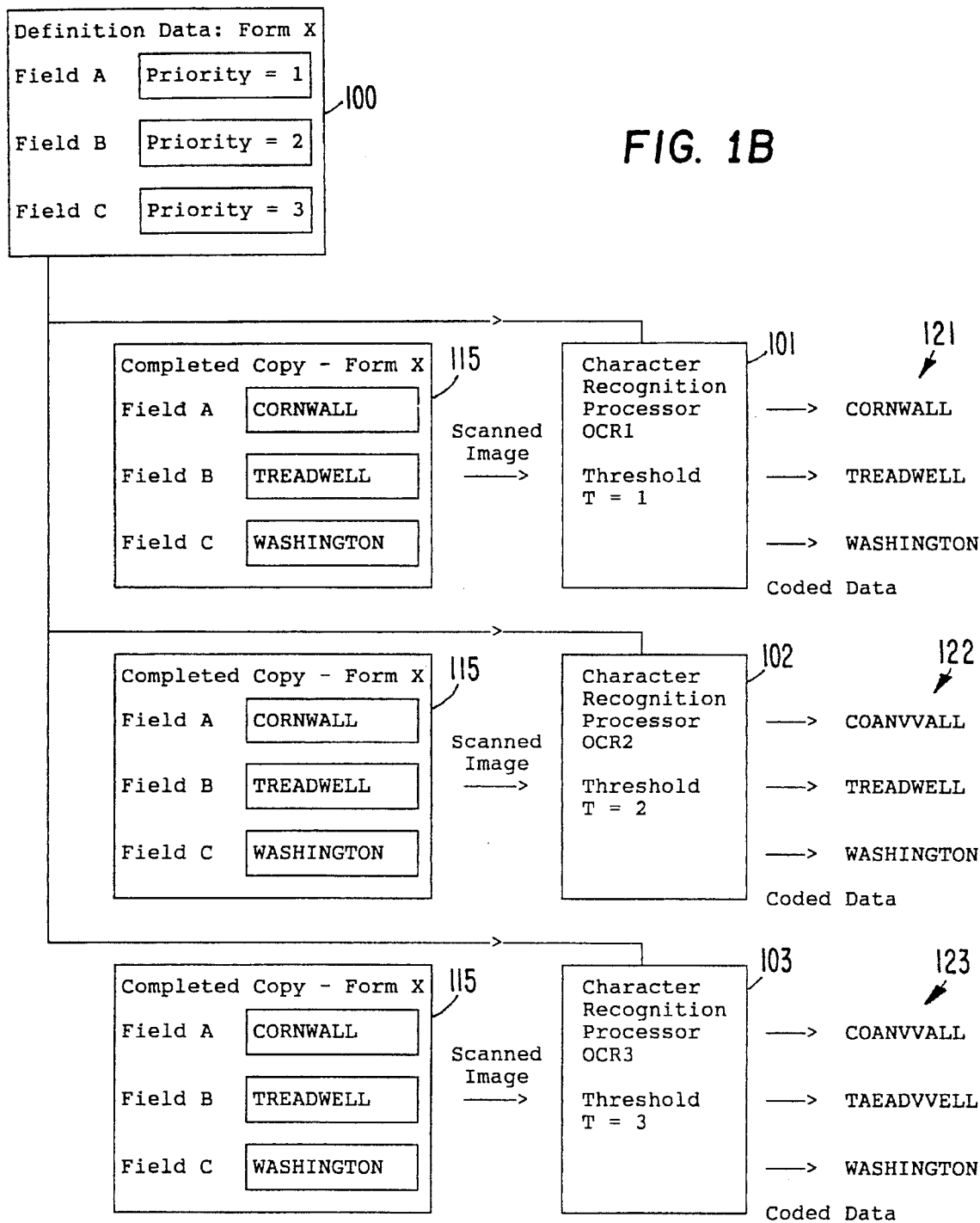
FIG. 1B is an organizational block diagram illustrating reducing character recognition quality based on field priority.

In an alternate embodiment of the invention, instead of skipping a particular field whose priority is insufficient to be processed, FIG. 1B shows that a degraded mode of character recognition can be applied to such a field. As is seen in FIG. 1B, the completed copy of the Form X 115 has Field B and Field C with the respective alpha strings "Cornwall," "Treadwell," and "Washington." In a high quality character recognition operation, each of these respective fields will be accurately recognized. For example, for the character recognition processor 101 of FIG. 1B, since its threshold value is set at one and since the priority value assigned to each of the fields is one or greater, a high quality character recognition process will be performed on each of the fields, resulting in an accurate recognition output as shown at 121.

However, if a degraded mode of character recognition is to be carried out for low priority fields, misrecognized characters will be output. For example, the W can be misrecognized as two consecutive V characters. Also, a R character can be misrecognized as A. Thus, it is seen for the character recognition processor 102 which has a threshold value of two, that Field A which has a priority of one has a degraded mode of character recognition applied to it, whereas Fields B and C which have priority values of two or greater have a high quality of character recognition process applied. This results in the output 122 of FIG. 1B. Similarly, it is seen that character recognition processor 103 has a threshold of three applied to it. Since only Field C has a priority of three or greater, only Field C will be accurately character recognized. The Fields A and B will have a degraded mode of character recognition applied to them, resulting in the output at 123.

Figure 2A:
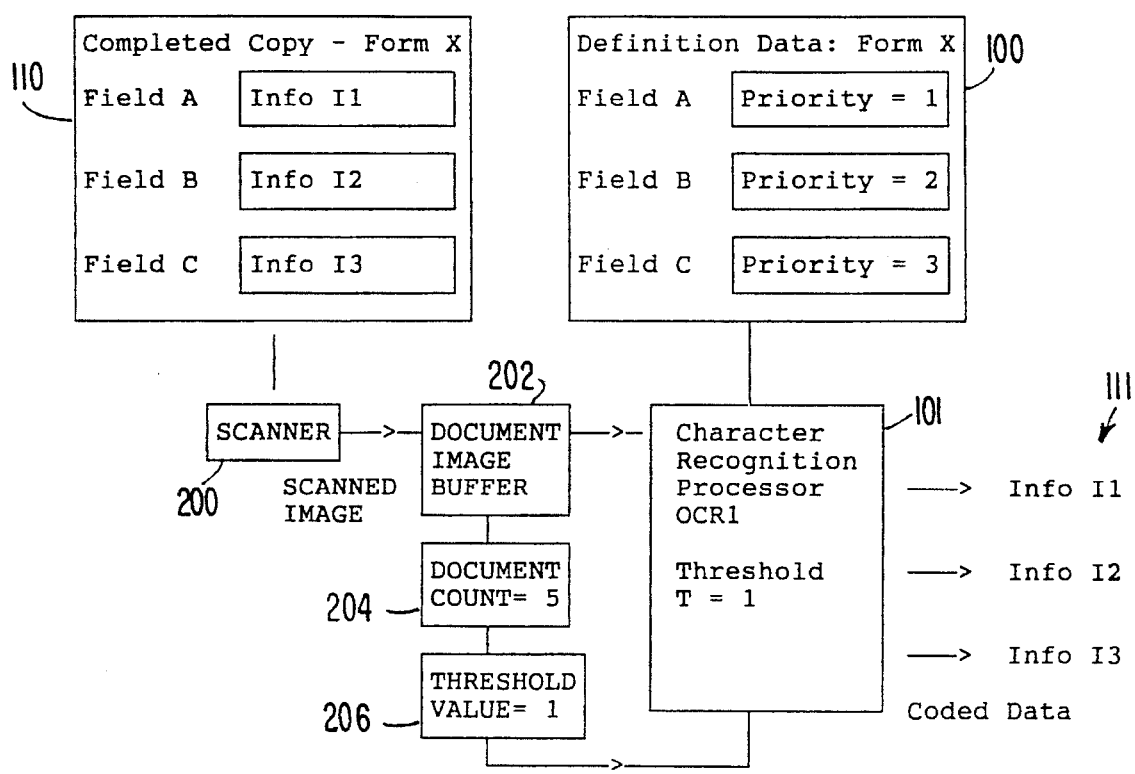
FIG. 2A illustrates a system block diagram showing a low threshold value resulting from a low document count in the document image buffer.
Figure 2B:
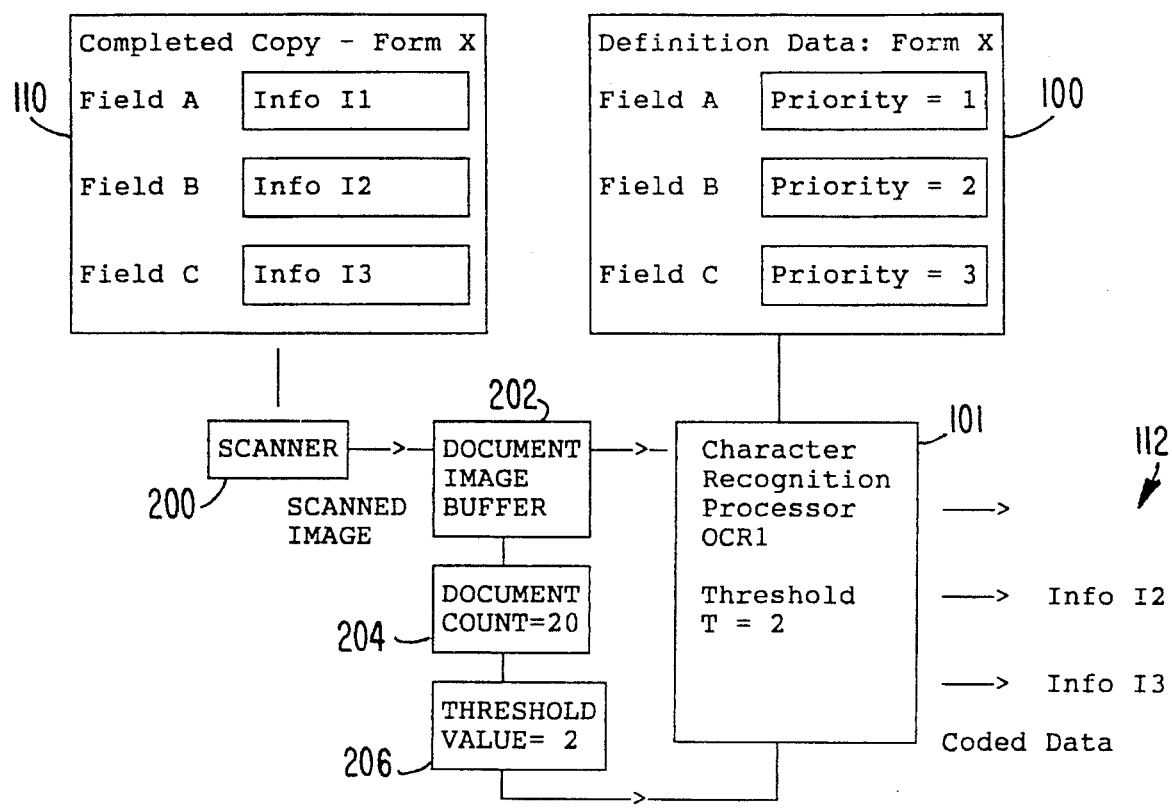
FIG. 2B is a block diagram illustrating an intermediate threshold value resulting from an intermediate document count in the document image buffer.
Figure 2C:
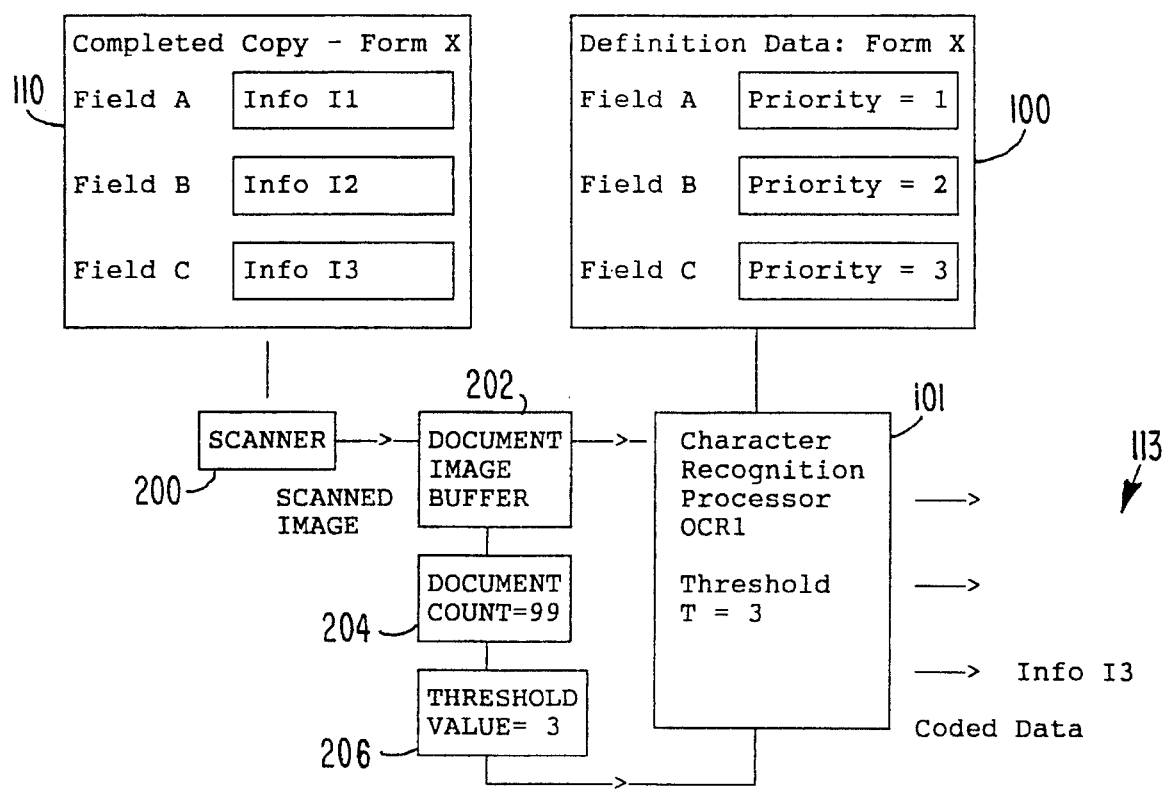
FIG. 2C is a block diagram illustrating a high threshold value which results from the high document count in the document image buffer.

This principle of assigning data capture priority values to individual fields in a document form, based upon the user's assessment of the relative importance of those fields, can be applied to the overall management of document processing throughput. This is illustrated in FIGS. 2A, 2B and 2C. In FIG. 2A, a document image processing system is shown which includes the scanner 200 which will scan a completed copy of Form X 110 and produce a scanned bit mapped image which will be transferred to the document image buffer 202. A plurality of document images can be stored in the document image buffer 202. The problem solved by the invention is how to limit variable sized buffered backlogs of document images while still using a relatively fixed overall document processing capacity. This is accomplished by assigning data capture priority values in the definition data set for Form X 100. There it is seen that Field A, Field B and Field C have assigned priorities of one, two and three, respectively. This information is input to the character recognition processor 101. Then further in accordance with the invention, the number of backlog document images buffered in the document image buffer 202 is counted in the document counter 204. For example, in FIG. 2A the document counter 204 has counted five documents which are backlogged and buffered in the document image buffer 202. In accordance with the invention, a relatively low document count of five, for example, will correspond to an assigned threshold value of one which is stored in the threshold value register 206. The threshold value in register 206 is then applied to a threshold input of the character recognition processor 101. Then, in accordance with the invention, those fields for the Form X which have a priority value which is greater than or equal to the current threshold applied to the character recognition processor 101 by the threshold value register 206, will be character recognized. In the example shown in FIG. 2A, since all three Fields A, B and C have priority values which are equal to or greater than the current threshold value of one, all three fields will be character recognized and provide the output 111.

This is in contrast to the example of FIG. 2B which shows the document count of 20 in the document counter 204, which means that there are 20 backlogged document images in the document image buffer 202. In accordance with the invention, the document counter having a value of 20, for example, causes the threshold value two to be stored in the threshold value register 206 and this value is applied to the threshold input of the character recognition processor 101. Then, in accordance with the invention, as each respective Fields A, B and C is considered by character recognition processor 101, since Field A has a priority value of one which is less than the current threshold value of two, Field A will be ignored. Fields B and C will have priority values which are two or greater and therefore Fields B and C will be character recognized providing the output shown at 112.

Contrast this with FIG. 2C wherein the document count of 99 is counted in the counter 204, corresponding to 99 backlogged document images buffered in the document image buffer 202. A document count of 99, for example, will cause a threshold value of three to be stored in the threshold value register 206, which is applied to the threshold input of the character recognition processor 101. As a result, only the Field C will have a priority of three which is greater than or equal to the current threshold value of three. Thus the output 113 only provides a character recognition output for Field C. In this manner, the document image processing system of FIGS. 2A, 2B and 2C will manage the overall throughput of documents processed so as to be held in a relatively constant rate, even though the number of backlogged document images buffered in the buffer 202 varies widely.

Figure 3A:
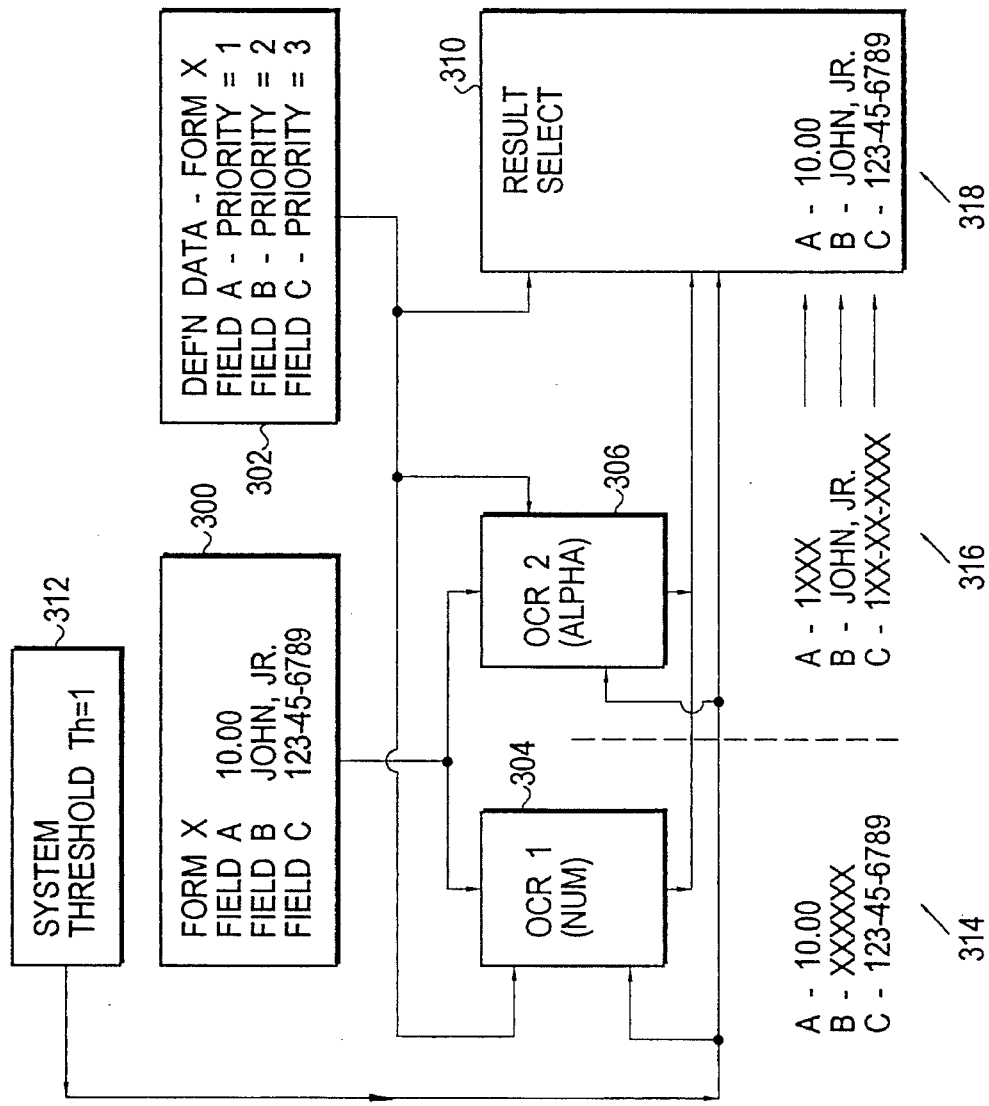
FIG. 3A is a block diagram illustrating the parallel operation of the two character recognition processors in response to a system threshold of one.
Figure 3B:
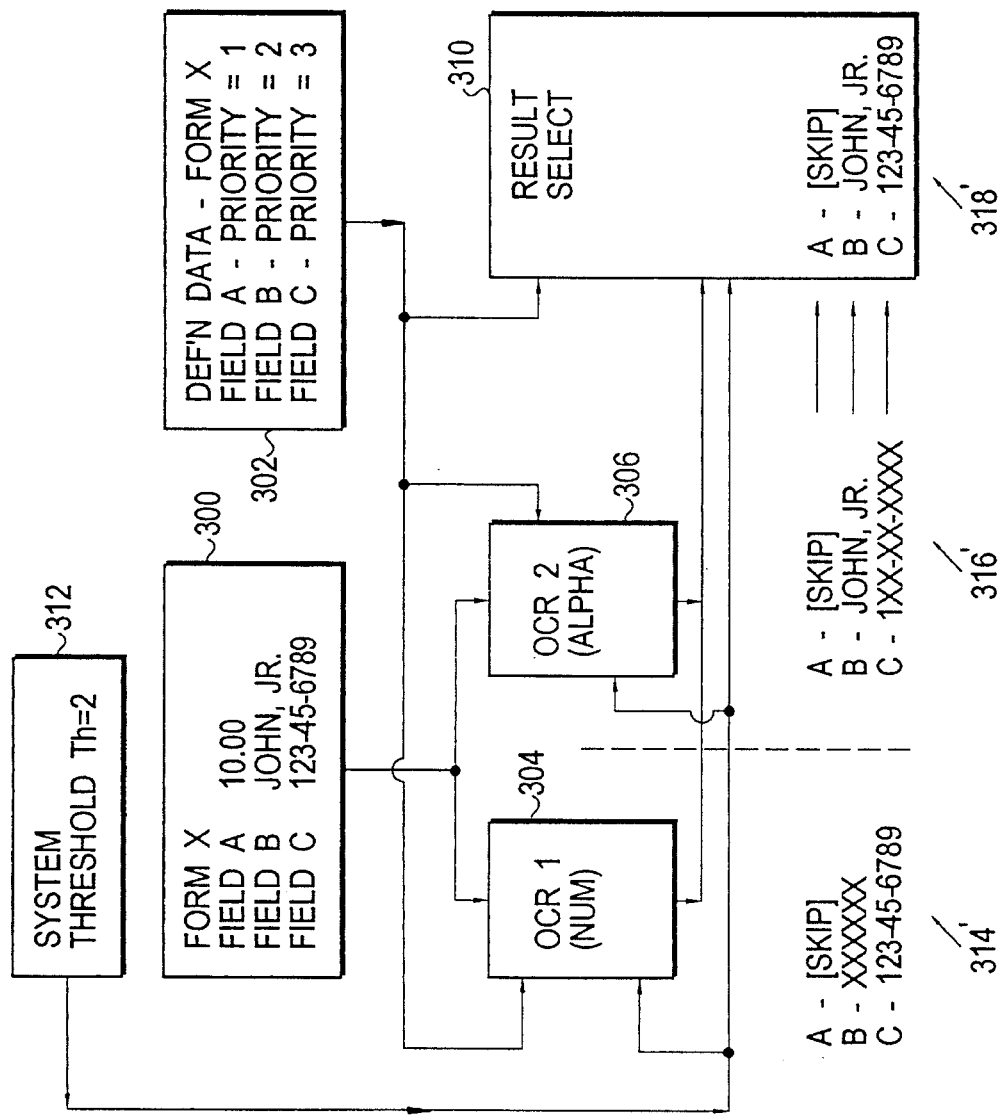
FIG. 3B is a block diagram illustrating the parallel operation of the two character recognition processors in response to a system threshold of two.
Figure 3C:
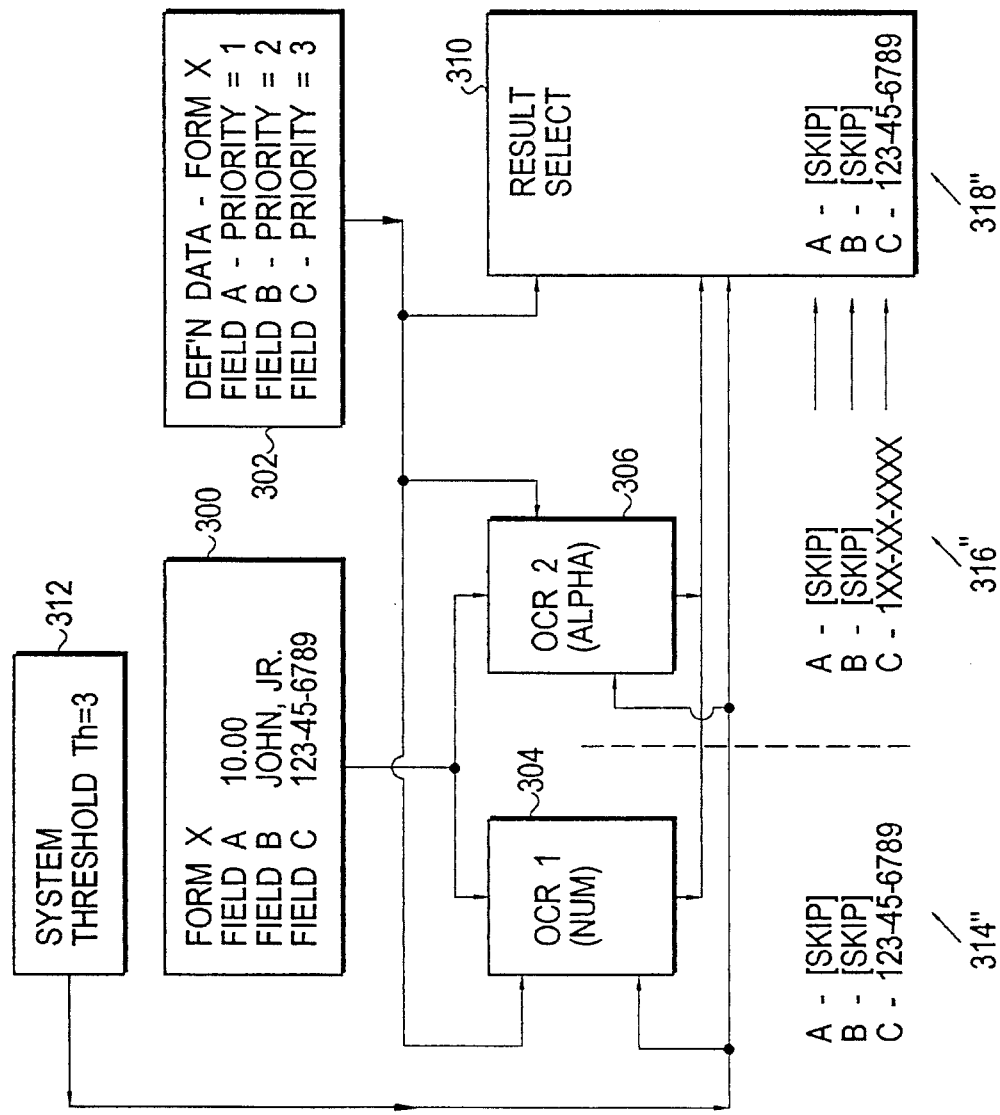
FIG. 3C is a block diagram illustrating the parallel operation of the two character recognition processors in response to a system threshold of three.

FIGS. 3A, 3B and 3C show an example of using two character recognition processors 304 and 306 in parallel. The character recognition processor 304 is suited for recognizing numerical characters whereas the character recognition processor 306 being suited for recognizing alphabetical characters. In the example shown in FIGS. 3A, 3B and 3C, the Form X has three Fields A, B and C, with the fields having their data capture priorities defined by the user in the definition data set 302. It is seen that Field A has a priority of one, Field B has a priority of two and Field C has a priority of three. The Form X is shown as item 300, and it is seen that Field A is a numeric field of 10.00, Field B is an alphabetical field of John, Jr. and Field C is a numeric field of 123-45-6789. The system threshold register 312 applies a current system threshold value of one in FIG. 3A, to the character recognition processors 304 and 306. This threshold value is a function of the backlogged volume of unprocessed document images 300. Since all three Fields A, B and C have priority values which are equal to or greater than the threshold value of one, the respective outputs of Fields A, B and C for the numeric character recognition processor 304, is shown in 314. It is seen that output 314 has an accurate recognition performed for the numeric Fields A and C and that an inaccurate recognition has been performed for the alphabetical Field B, as would be expected for this specialized numeric processor 304. Correspondingly, it is seen that all three Fields A, B and C have been processed by the character recognition processor 306, and that they have been output at 316. It can be seen that the output 316 for Fields A and C are inaccurate, as would be expected since these are numeric fields and the processor 306 is more particularly suited to alphabetic recognition. It is seen however that Field B in 316 has been accurately recognized as the "John, Jr." since the character recognition processor 306 is an alphabetic processor. The results for the two character recognition processors 304 and 306 for each respective field can be combined by the result select processor 310, which selects the output from each respective character recognition processor 304 or 306, having the lesser number of misrecognized characters in each particular field. This results in the output 318 for Field A, Field B and Field C having a selective result which an accurate representation of the original bit mapped image for the three fields in the copy of Form X at 300.

Contrast this with the situation in FIG. 3B where the system threshold in the register 312 has changed to a value of two. In this case, the output 314' of the character recognition processor 304 will have skipped the Field A since its priority is less than the threshold value. Correspondingly, the output 316' for Field A in the second character recognition processor 306 will also have been skipped. The combined result in the result select processor 310, which picks that processor output from 304 or 306 which has the fewer number of misrecognized characters, is shown at 318'. In particular, it is seen that Field A has been skipped in 318' because it is skipped for both of the processors 304 and 306. Fields B and C have been selected in 318' since they are available from the processors 304 and 306, as was discussed for FIG. 3A.

Contrast this in turn with the situation in FIG. 3C where the system threshold has been raised to a value of three in the register 312. In this case, the outputs 314" and 316" for both Fields A and B for both the processors 304 and 306 are skipped and accordingly they are also skipped in the result select processor 310. Only the Field C, which has a priority value which is greater than or equal to the threshold value of three, has an output from the two processors 304 and 306. The output at 314" and the output at 316" are applied to the result select processor 310, which selects the accurate Field C value output 314" from the processor 304. Thus it can be seen that by assigning data capture priorities in a definition data set 302, parallel character recognition operations can be managed to accommodate variations in the system threshold at 312, such as might be assigned from the number of backlogged documents to be processed by the system.

Figure 4:
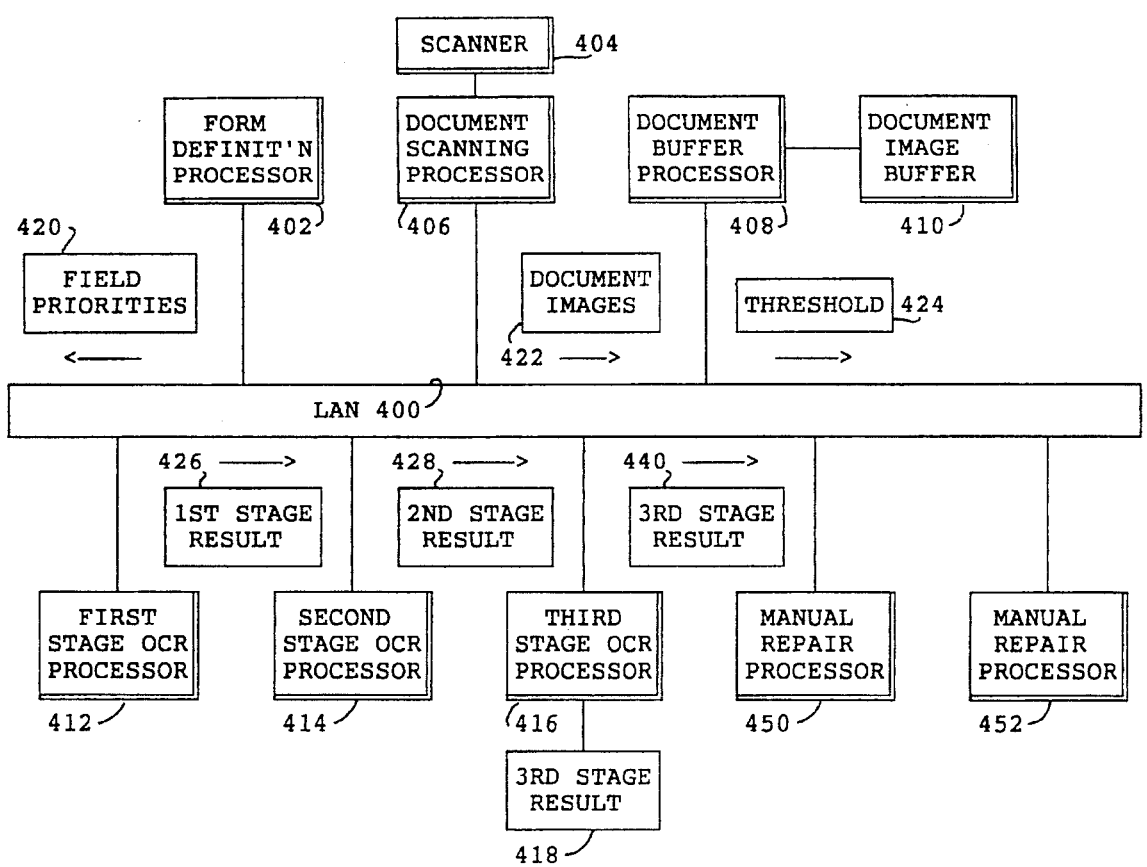
FIG. 4 is an overall system block diagram of the invention.
Figure 10A:
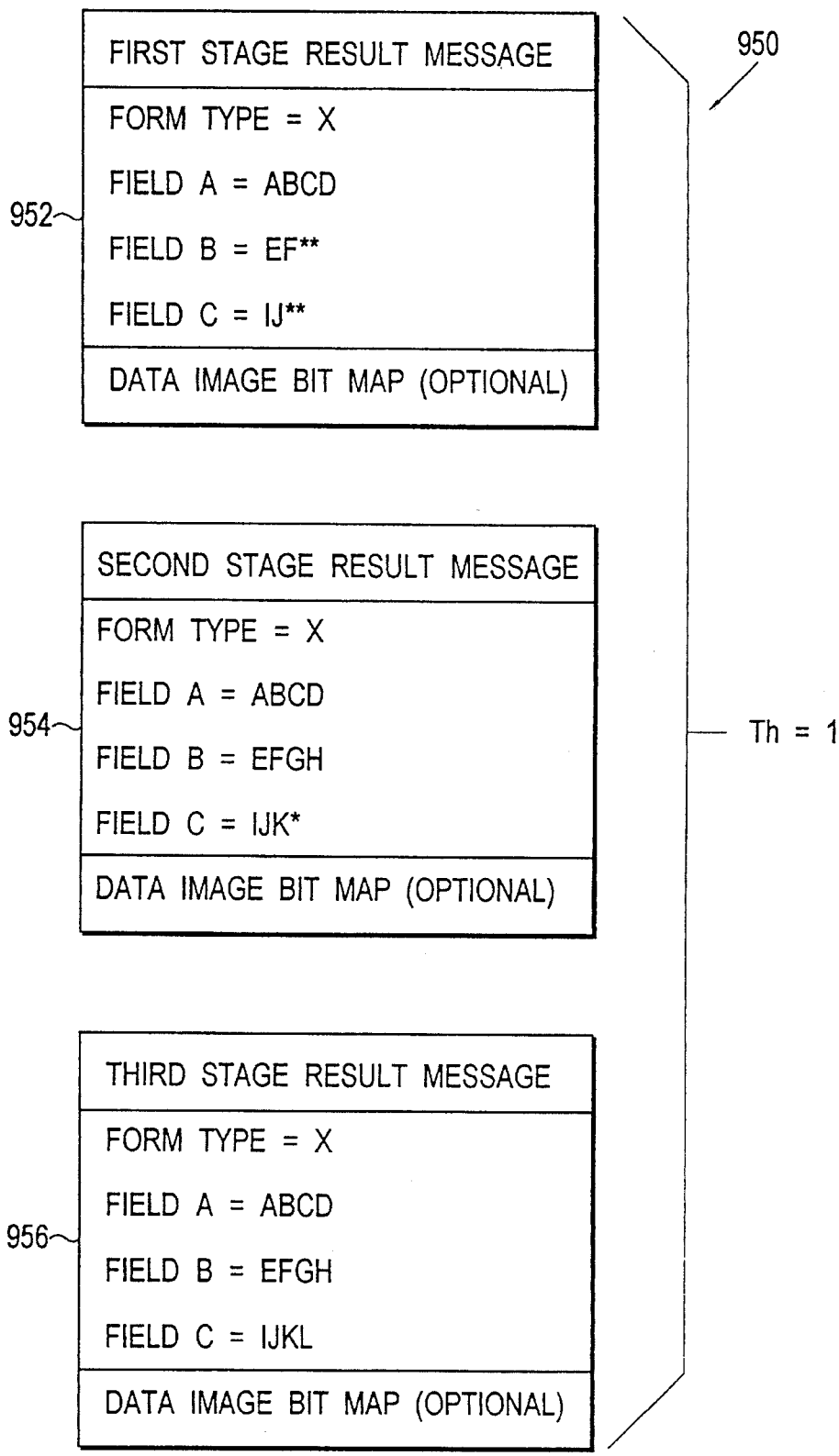
FIG. 10A illustrates the first stage, second stage and third stage result messages for a threshold of one.

FIG. 4 is a system block diagram of a document processing system which manages the throughput of the character recognition processing by using data capture priorities. The local area network (LAN) 400 interconnects a form definition processor 402, with a document scanning processor 406, the document buffer processor 408, the first stage character recognition processor 412, the second stage character recognition processor 414 and the third stage character recognition processor 416. The document scanning processor 406 receives bit mapped document images from the scanner 404. The document image buffer 410 buffers document images 422 output from the document scanning processor 406 over the local area network 400, and processed by the document buffer processor 408. Examples of document images 422 are shown in FIGS. 9E, 9F and 9G, as 910, 912 and 914, respectively. The document buffer processor 408 will include a backlogged document image counter 204 as was described in FIG. 2C, and will produce a threshold value which corresponds to the number of backlogged documents buffered in the document image buffer 410. That resulting document count will be converted into a threshold value which is output as a threshold message 424 on the local area network 400. The example of a threshold message 424, is shown in FIG. 9D as 908. The form definition processor 402 will output form definition data sets which include the field priorities 420 and form definition data set messages which will be transmitted over the local area network 400 to the first stage, second stage and third stage processors 412, 414, 416. Examples of form definition data sets are shown in FIGS. 9A, 9B and 9C as 902, 904 and 906, respectively. Each will contain field priorities 420 which have been assigned by the user based on his assessment of the relative importance of the field to his line of business. The threshold message 424 produced by the document buffer processor 408, will be transmitted over the local area network 400 to the first stage, second stage and third stage character recognition processors, 412, 414 and 416. When the first stage character recognition processor 412 processes a first document image to perform character recognition on its respective fields, it will consult the document definition data set 902 and in particular field priorities 420 to determine which fields have priorities which are equal to or greater than the threshold value which is set in the threshold message 424 received at that processor. Then the first stage character recognition processor 412 will perform character recognition operations on those fields whose data capture priority value is greater than or equal to the threshold value. This will result in a first stage result message 426 which will be transmitted on the local area network 400 to either the second stage processor 414 or the third stage processor 416. An example of a first stage result message 426 is shown in FIG. 10A as 952. If a serial operation is being performed with a first stage character recognition processor 412 followed by the second stage character recognition processor 414, where both processors are being applied to the same field, then the second stage character recognition processor 414 will receive the first stage result message 426, and will combine that information with the field priority values 420 and with the threshold value from 424 to determine which of the several fields in the document form will be processed. Only those fields will be processed which have a priority value greater than the threshold value. The resulting character recognition operation in the second stage processor 414 will produce a second stage result message 428 which is output on the local area network 400. This will be sent to the third stage processor 416. An example of a second stage result message 428 is shown in FIG. 10A as 954. A similar sequential staging operation can be performed at the third stage character recognition processor 416, making use of the results in the second stage result message 428, in combination with the field priorities 420 and the threshold 424, so as to perform character recognition operations on only those fields that have a data capture priority value which is greater than the threshold value. The output of the third stage character recognition processor 416 can then be applied to the third stage result buffer 418 in FIG. 4. An example of a third stage result message output by processor 416 is shown in FIG. 10A as 956.

Figure 5:
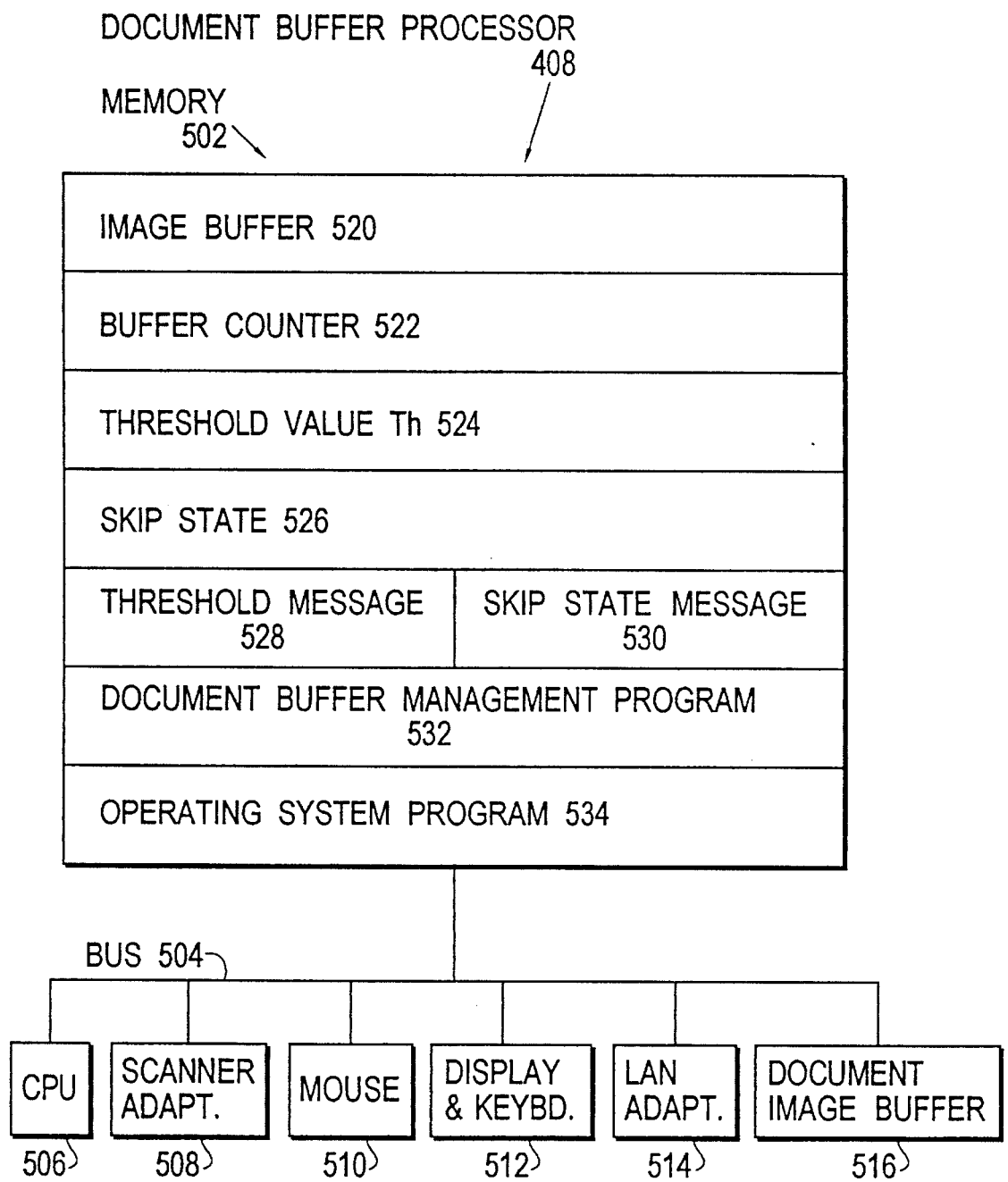
FIG. 5 is a more detailed diagram of the document buffer processor.

FIG. 5 is a more detailed functional block diagram of the document buffer processor 408. The processor 408 includes the memory 502 which is connected by means of the bus 504 to the CPU 506, a scanner adapter 508, which is connected to the scanner 404, the mouse 510, the display and keyboard 512, the local area network adapter 514 which connects to LAN 400 and the document image buffer 516 which connects to buffer 410. Stored within the memory 502 is the image buffer 520 which stores the bit mapped image 422 received from the document scanning processor 406. Also included in the memory 502 is a buffer counter 522 which performs the function described for the buffer counter 204 of FIG. 2B. Also contained in the memory 502 is the threshold value TH register 524, the skip state register 526, the threshold message buffer 528, and the skip state message buffer 530. Also included in the memory 502 is the document buffer management program 532, whose flow diagram is shown in FIG. 6. The document buffer management program is a sequence of executable instructions which, when executed by the CPU 506, carries out the method shown in FIG. 6. Also shown in the memory 502 is the operating system program 534.

The document buffer management 532 is shown in the flow diagram of FIG. 6. Step 600 begins the document buffer management program which flows to step 602 which receives the document image from the document scanning processor 406 as the document image 422, and buffers it in the buffers 520 and 516 before storing it in the document image buffer 410. Then step 604 increments buffer counter 522 count value CNT. Then step 606 computes the threshold value TH. In this example, if the document count CNT is less than 10, this will correspond with a threshold of one. If the document count is greater than or equal to 10 and less than or equal to 50, then this will correspond to a threshold of two. If the document count is greater than 50, then this will correspond to a threshold of three. Then the flow diagram proceeds to step 608 which determines if the threshold value has changed with the buffering of the last received document image 422 in the document image buffer 410. If it has, then the document buffer processor 408 prepares a threshold message 424 in partition 528 and outputs it to the LAN 400. Reference can be made to FIG. 9D, message 908, as an illustration of threshold message 424. Reference can also be made to FIGS. 9E, 9F and 9G for illustrations of document images 422 as the Form X 910, Form Y 912 and the Form Z 914.

The flow diagram of FIG. 6 then proceeds to step 610 which determines if there are any pending requests for stored images. These requests would be made by the first stage character recognition processor 412, for example, to the document buffer processor 408. Then in step 612, if a document image 422 is requested, it is accessed from the document image buffer 410 and sent to the requestor such as the first stage character recognition processor 412. Then step 614 will decrement the buffer counter 522 by one. Then step 616 will compute a new threshold value of TH. Step 618 determines if the threshold value TH has changed. If it has changed, then a new threshold message 424 is output to the local area network 400. Then step 620 determines if the threshold has been changed by the user or system administrator at a select input, such as at the keyboard 512. If the user has requested a change in the threshold TH, then a new threshold message 424 is output to the local area network 400. Then step 622 determines if the skip state has changed. The skip state is a user defined state wherein the user indicates the action to be performed by a character recognition processor if the priority of a particular field is not greater than the current threshold value. In this example, if the skip state is zero, then a degraded mode of character recognition is applied by processor 412, 414 or 416 to any field that has a priority less than the current threshold value. Alternately, if the skip state is set by the user to be a value of one, then any field whose priority value is not greater than the current threshold value, will be skipped by the character recognition processor 412 or 414 or 416. Then step 624 of FIG. 6 returns to the main program.

Figure 7A:
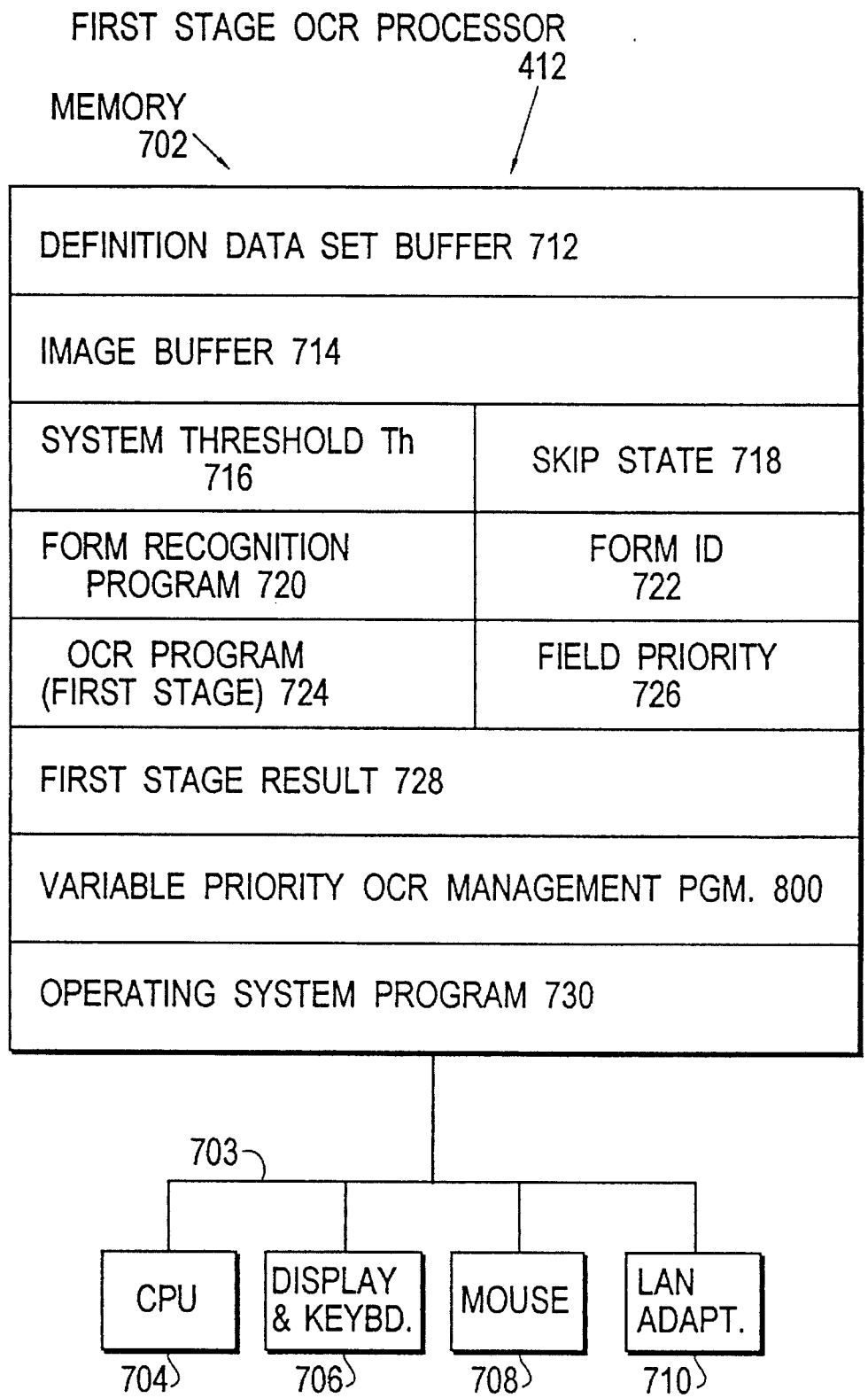
FIG. 7A is a detailed block diagram of the first stage OCR processor.
Figure 7B:
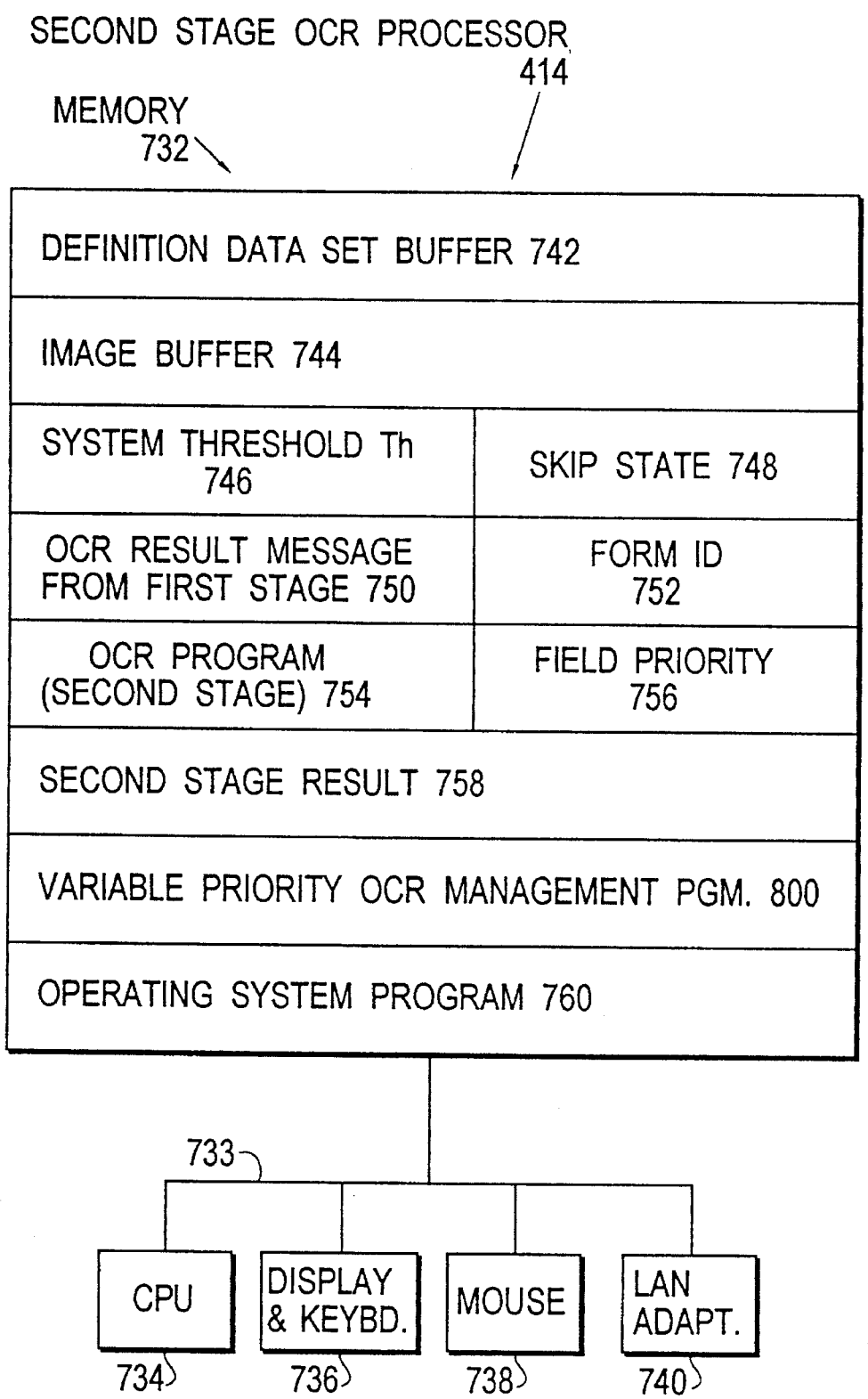
FIG. 7B is a detailed block diagram of the second stage OCR processor.
Figure 8A:
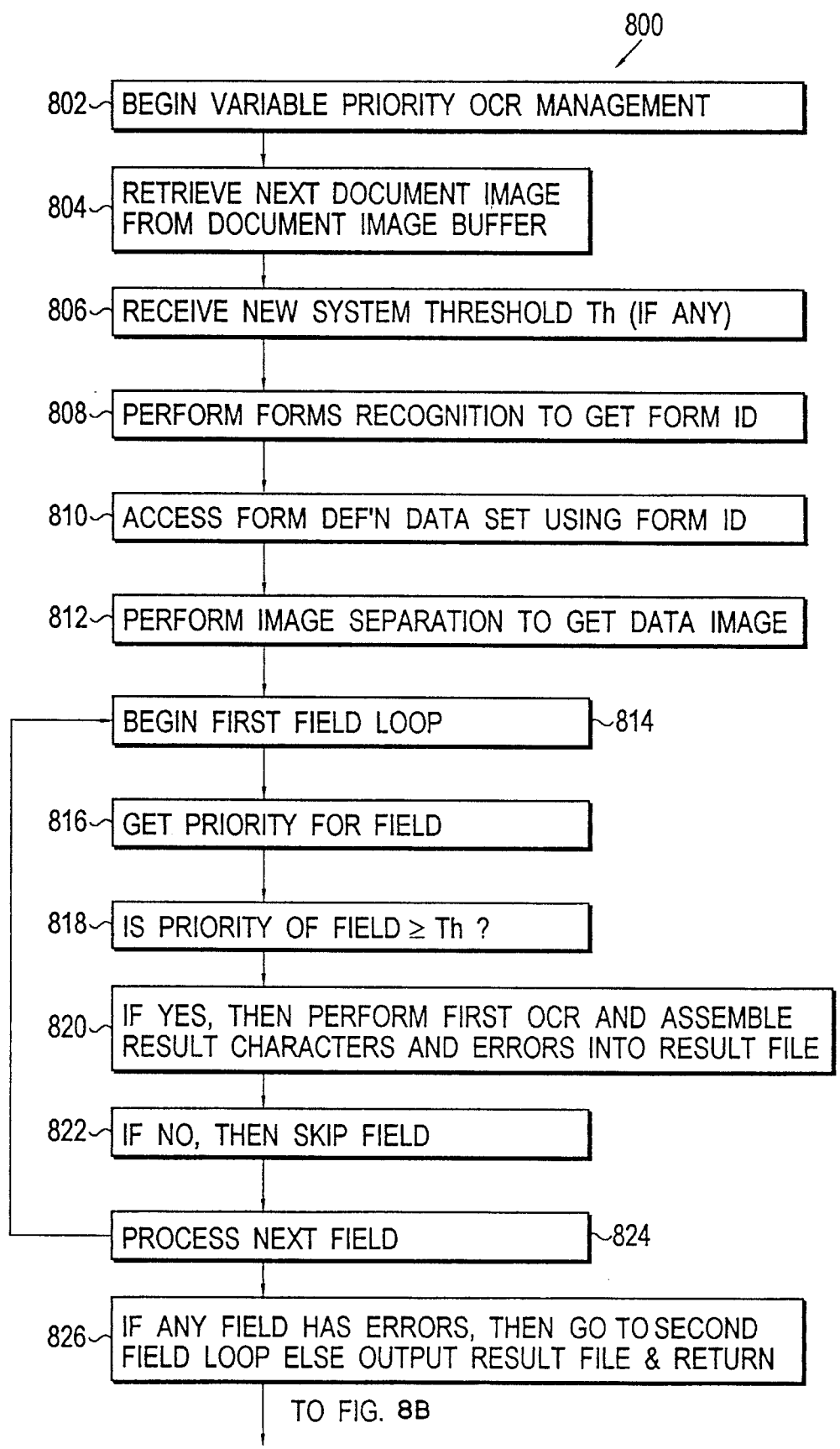
FIGS. 8A, 8B and 8C are flow diagrams of the variable priority OCR management program and method.
Figure 8B:
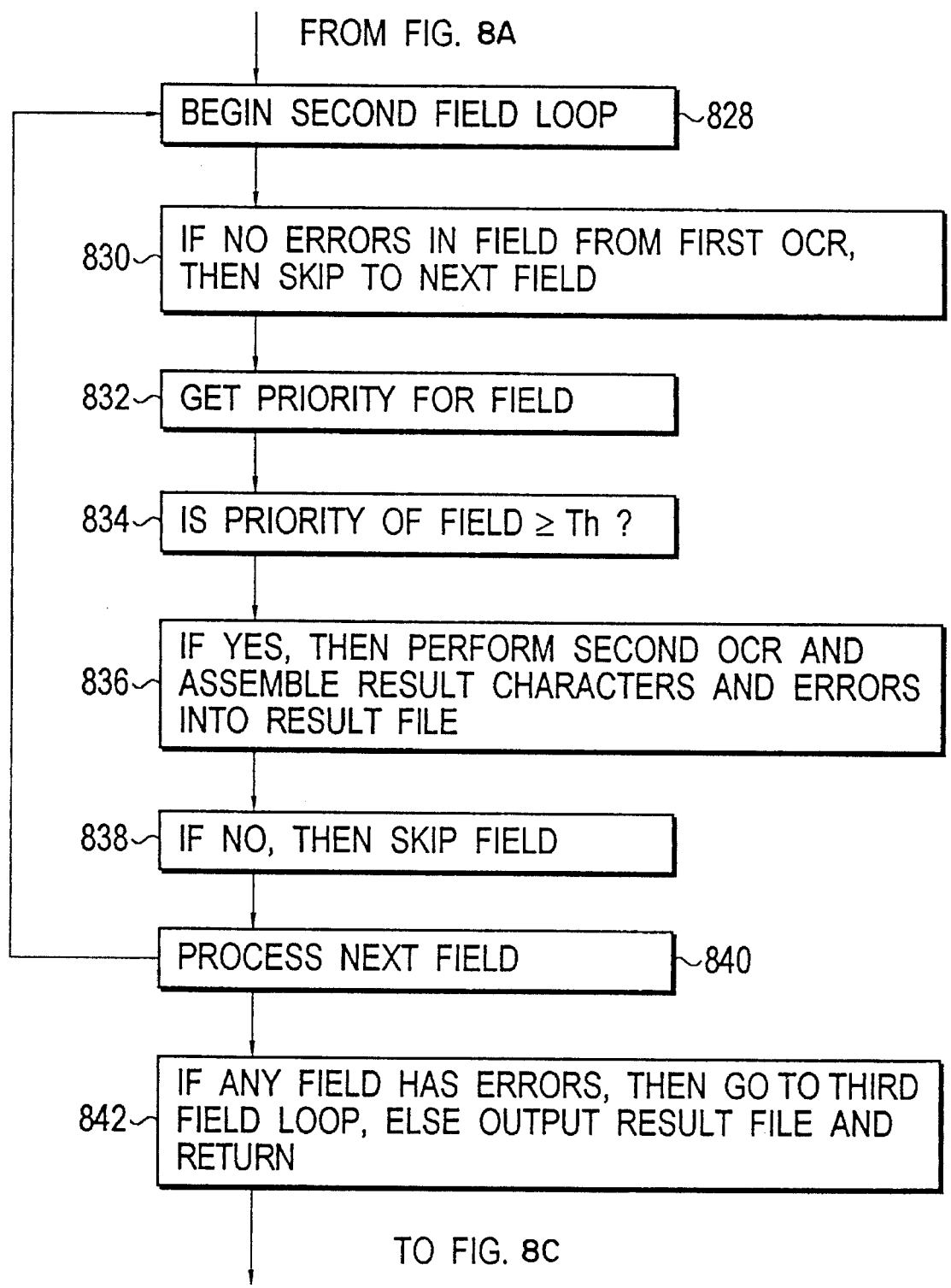
Figure 8C:
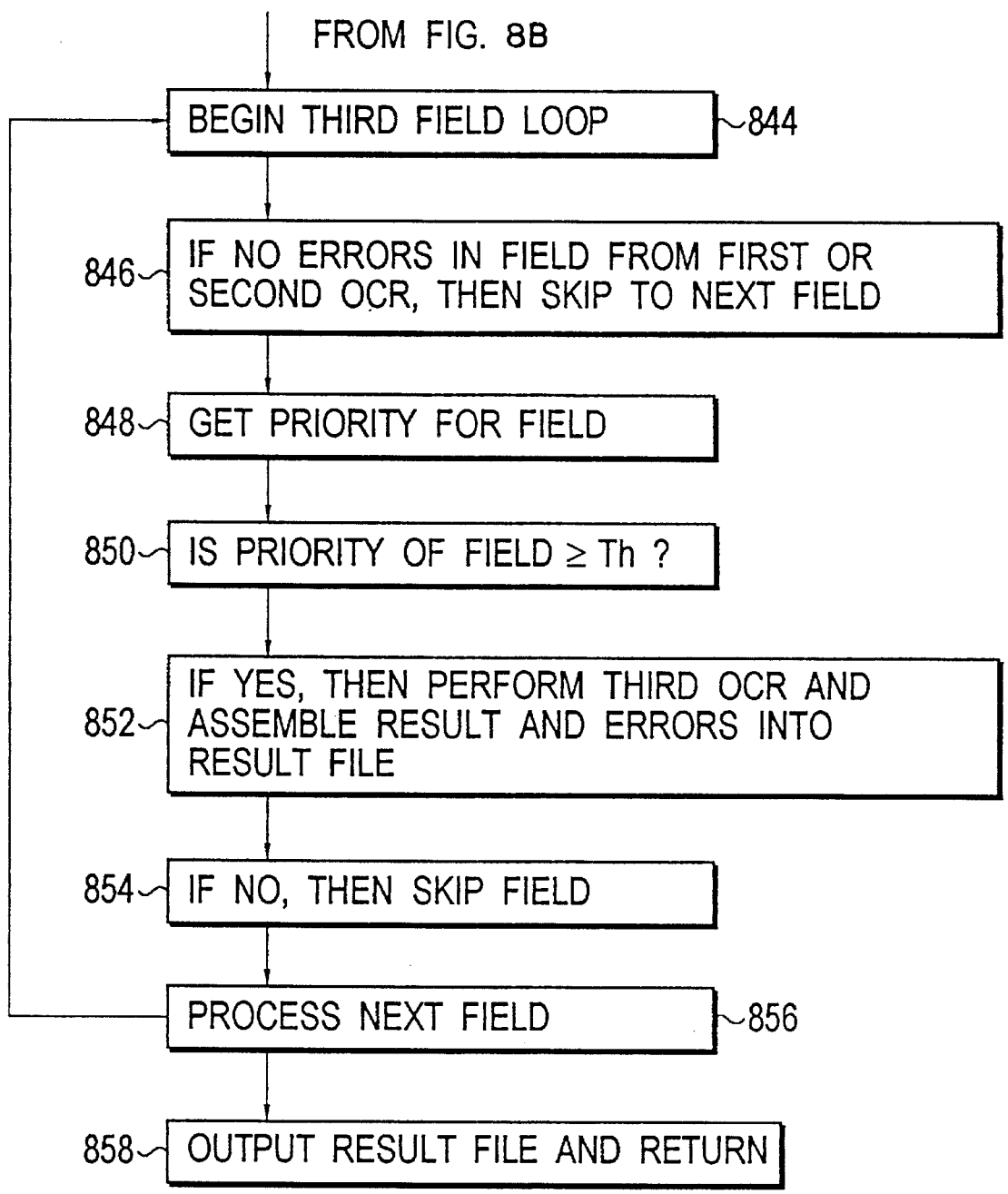

FIG. 7A illustrates the first stage OCR processor 412 of FIG. 4. The processor 412 of FIG. 7A includes the memory 702 which is connected by the bus 703 to the CPU 704, the display and keyboard 706, the mouse 708 and the local area network adapter 710, which connects to LAN 400. The memory 702 includes a definition data set buffer 712 which will store the definition data set 902 or FIG. 9A, which includes the field priorities 420. The memory 702 also includes the image buffer 714 which will store the document image 422 which is output from the document buffer processor 408. The memory 702 will also include the system threshold TH buffer 716 which will store the threshold value TH in the threshold message 424. The memory 702 also includes the skip state buffer 718 which will store the skip state value in the threshold message 424. The memory 702 can include a form recognition program 720. The form recognition program 720 will analyze the document image 422 and will characterize the document image as one of several predefined document forms which is specified by a form ID value. The form ID value will be stored in the form ID buffer 722. Suitable form recognition programs are described in the copending above cited patent by Casey, et al. The form recognition function can also be carried out in a separate processor. The memory 702 also includes the first stage OCR program 724. This is the character recognition program is executed by the first stage OCR processor 412. The field priority register 726 will temporarily buffer the field priority value which has been assigned to the current field being processed by OCR program 724, as defined by the form definition data set 902, which is stored in the definition data set partition 712. The first stage result buffer 728 will store the first stage result message 426, an example of which is 952 in FIG. 10A. Buffer 728 will store the resulting character string, both the accurately recognized characters and the misrecognized or omitted characters, resulting from the execution of the OCR first stage program 724. The memory 702 also includes the variable priority management program 800 whose flow diagram is shown in FIGS. 8A, 8B and 8C, which will be described later, in greater detail. Also included in the memory 702 is the operating system program 730. These programs are executed in CPU 704. The second stage OCR processor 414 in the system of FIG. 4, is shown in greater detail in FIG. 7B. The processor 414 includes the memory 732 which is connected by the bus 733 to the CPU 734, display and keyboard 736, mouse 738 and local area network adapter 740, which is connected to LAN 400. The memory 732 also includes the definition data set buffer 742, the image buffer 744, the system threshold TH register 746, and the skip state register 748. Also included in the memory 732 is the first OCR result message partition 750. The first stage result message 426 (952 in FIG. 10A) from the first stage processor 412, will be stored in this partition 750. The form ID in 752 is derived from the OCR result message 426 (Form X in this example). The OCR second stage program 754 will perform the second stage character recognition operations in the processor 414. The field priority register 756 will store the priority of the current field being analyzed, as is defined in the definition data set stored in the buffer 742. The output of the OCR second stage program 754 will be buffered in the second stage result buffer 758. The contents of this buffer can include the accurately recognized characters from the first stage character recognition processor 412, the accurately recognized characters recognized by the OCR second stage program 754, and the misrecognized and omitted characters resulting from the second stage OCR program 754. The second stage results 758 will be output as the second stage result message 428 on the LAN 400, shown as 954 in FIG. 10A. Also included in the memory 732 is the variable priority OCR management program 800, which is shown as a flow diagram in FIGS. 8A, 8B and 8C. The operating system program 760 is also included in the memory 732. These programs are executed in CPU 734.

Figure 7C:
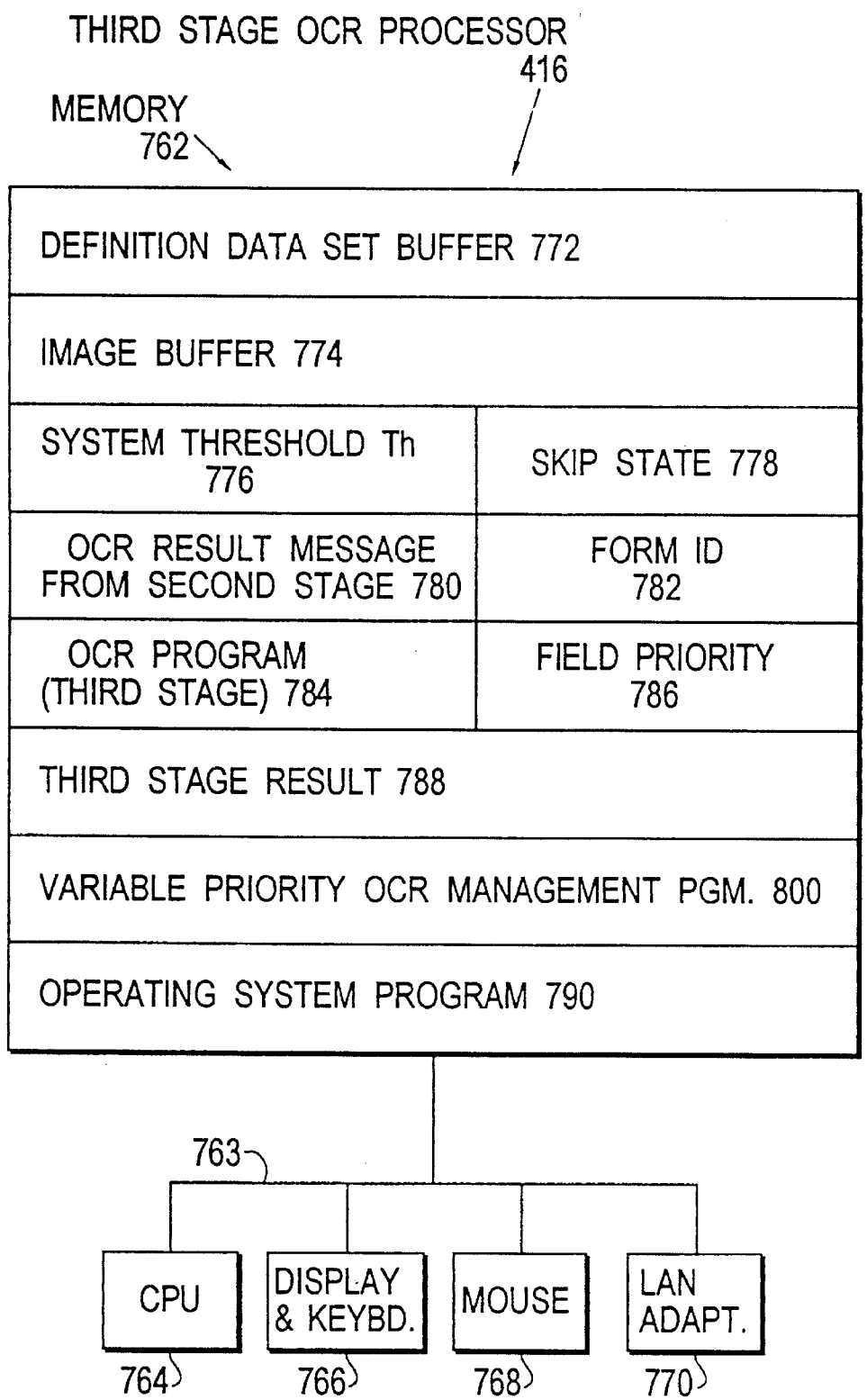
FIG. 7C is a detailed block diagram of a third stage OCR processor.

The third stage OCR processor 416 of the system diagram of FIG. 4, is shown in greater detail in FIG. 7C. It includes the memory 762 which is connected by the bus 763 to the CPU 764, the display and keyboard 766, the mouse 768 and the LAN adapter 770, which is connected to the LAN 400. Included in the memory 762 is the definition data set buffer 772, the image buffer 774, the system threshold TH register 776, the skip state register 778, and the second stage OCR result message partition 780. The second stage result message 428 (954 in FIG. 10A) will be stored in the partition 780. The form ID 782 will be derived from the second stage result message 428. The OCR third stage program 784 will be the character recognition program performed in the third stage processor 416. The field priority 786 is the priority of the current field under analysis, as defined in the definition data set buffer 772. The output of the third stage OCR program in 784 will be stored in the third stage result buffer 788. The contents of this buffer 778 will be the third stage result message 956 in FIG. 10A, which includes the accurately recognized characters from the first stage processor 412, the accurately recognized characters from the second stage processor 414, the accurately recognized characters from the third stage OCR program in 784, the inaccurately recognized characters and the omitted characters from the third stage OCR program in 784. The contents of the third stage result buffer 788 will then be output as the third stage result 418 in the system of FIG. 4. Also included in the memory 762 is the variable priority OCR management program 800 which is shown in the flow of diagram in FIGS. 8A, 8B and 8C. The operating system program 790 is also included in the memory 762. These programs are executed in CPU 764.

FIGS. 8A, 8B and 8C show the flow diagram of the variable priority OCR management program 800, a copy of which is executed in each of the processors 412, 414 and 416. The flow diagram for the program 800 begins at step 802 and flows to step 804 to retrieve the next document image 422 of the document image buffer 410. Step 806 receives the new threshold value TH, if there is any new threshold message 424. The step 808 performs the forms recognition operation to get a form ID value (for example "Form X") which is stored in the partition 722, 752 and 782. Then step 810 accesses the form definition data set (for example 902 in FIG. 9A) using the form ID value, and stores it in the definition data set buffer 712, 742 and 772. Then step 812 performs the image separation to get the data image. This function can be a part of the OCR first stage program 724 stored in the first processor 412, or it can be performed in a separate processor. The operation separates the background image of the form from the data image of the information which has been entered into the respective fields on the form.

Then step 814 begins the first field loop which is performed in the first processor 412. Step 816 gets the priority for the field from the form definition data set 902. Then step 818 determines if the priority for the current field is greater than the threshold value as has been defined by the threshold message 424. In Step 820, if the priority of the field is greater than the threshold value, then perform the first OCR character recognition operation 724 in the first stage processor 412, and assemble the result characters and errors into the first stage result message 426 (952 of FIG. 10A). Step 822 determines if the priority of the field is not greater than or equal to the threshold TH, then skip the field. Then step 824 processes the next field and loops back to step 814. If there are no more fields, then step 826 determines if any field has errors resulting from the first stage character recognition operation 724. If it does, then the flow goes to the second field loop at the step 828. Otherwise, if there are no errors then the first stage result 426 becomes the final output of recognized characters for the document and the program returns to main program. This final result character string 426 can be utilized in processor 412, displayed by display 706, or sent to another device connected to LAN 400 for use in the user's line of business.

In FIG. 8B, step 828 begins the second field loop which is performed in the search processor 414. In step 830, if there are no errors in the field from the first stage character recognition 412 as revealed by the first stage result message 426, then the program skips to the next field. In step 832, get the priority for the field from the form definition data set 902, which in this case is in the buffer 742. Then step 834 determines whether the priority is greater than or equal to the threshold in the threshold message 424. If it is, then the second stage processor 414 performs the second character recognition operation 754 and assembles the result characters and errors into a result file which is the second stage result message 428 (954 of FIG. 10A). In step 838, if the priority of the field is not greater than or equal to the threshold value TH, then the field is skipped. Then step 840 processes the next field and the loop goes back to step 828. If there are no more fields, then step 842 determines if any field has errors, and if it does, then the program goes to a third field loop step 844. Otherwise, the second stage result message 428 contains the final character recognition output for this document and the program returns to the main program. The final result character string 428 can be utilized in processor 414, displayed by display 736, or sent to another device connected to LAN 400 for use in the user's line of business.

FIG. 8C begins the third field loop which is executed in the in third stage character recognition processor 416. Step 844 begins the third field loop. Step 846 determines if there are no errors in the field from the first or the second character recognition processors 412 and 414 as revealed by the second stage result message 428, then skip to the next field. Step 848 gets the priority for the field from the form definition data set 902 in the buffer 772. Step 850 determines if the priority of the field is greater than or equal to the threshold value TH as specified in the threshold message 424. If yes, then step 852 performs the third stage character recognition operation 784 in the processor 416 and assembles the result and errors into the result file 956 of FIG. 10A, which will be output to the third stage result buffer 418. If step 854 determines that the priority is not greater than or equal to the threshold voltage TH, then skip the field. Step 856 then processes the next field and loops back to step 844. Step 858 is carried out after all other fields have been processed for the document, and outputs the result file 956 of FIG. 10A to the buffer 418 and returns to the main program. The result file will contain the accurately recognized characters for the processor 412, the accurately recognized characters for the processor 414, the accurately recognized characters for the processor 416, the inaccurately recognized characters and the omitted characters. The final result character string in buffer 418 can be utilized in processor 416, displayed by display 766, or sent to another device connected to LAN 400 for use in the user's line of business.

Figure 10B:
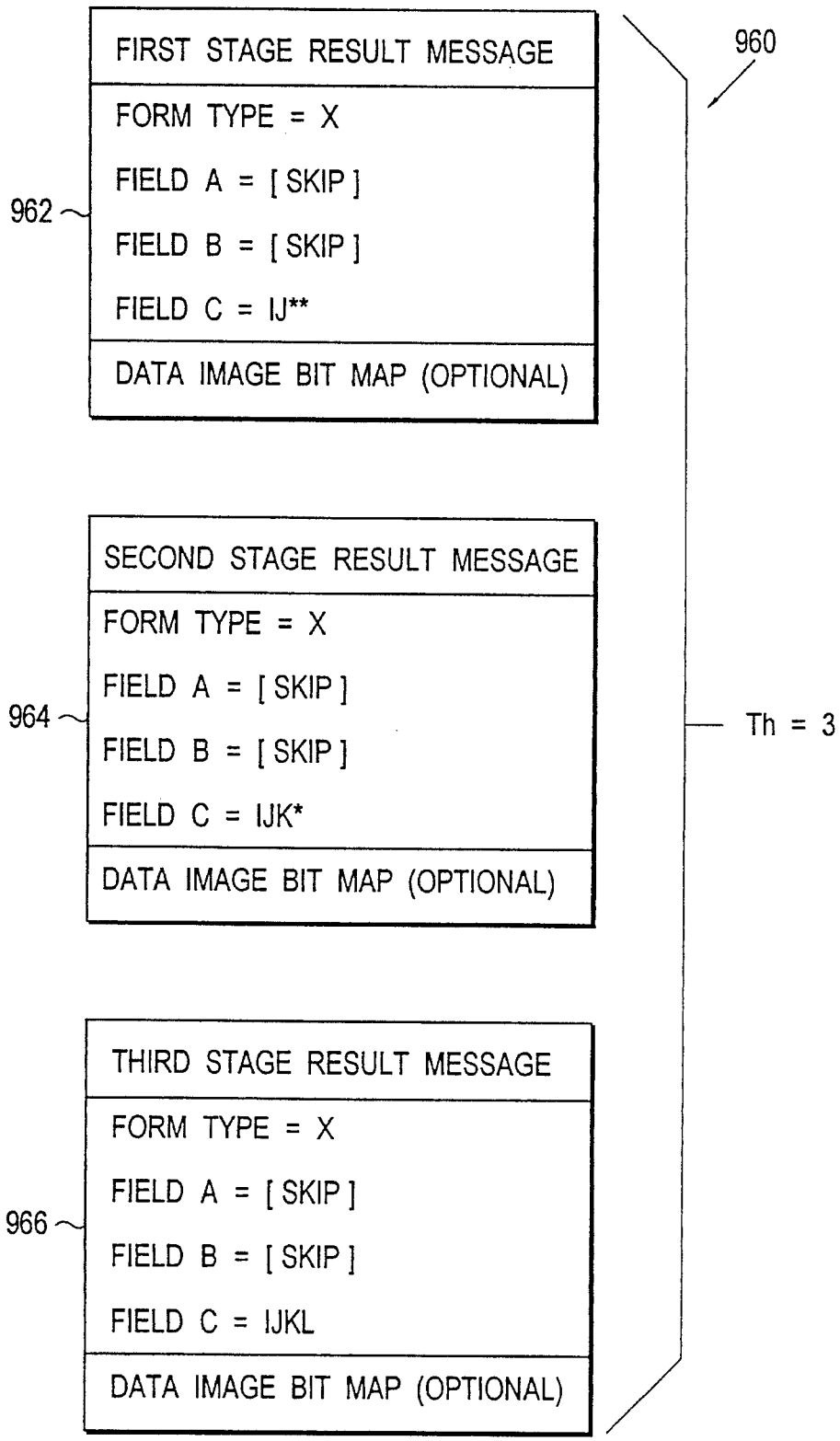
FIG. 10B illustrates the first stage, second stage and third stage result messages for a threshold of three.

An example of the operation of the system described in FIG. 4 is given in connection with the form definition data sets FIGS. 9A, 9B and 9C, the threshold message in FIG. 9D, the first stage, second stage and third stage result messages 952, 954 and 956 in FIG. 10A where the threshold equals one and the first stage, second stage and third stage result messages 962, 964 and 966 in FIG. 10B where the threshold equals three. If a Form X has been scanned into the system of FIG. 4 and recognized as a type "X" form, then the definition data set 902 of FIG. 10A will be invoked to determine the data capture priority values for the Fields A, B and C. The Form X scanned into the system of FIG. 4 is 910 shown in FIG. 9E. In the first example of FIG. 10A, if the document buffer processor 408 determines that the threshold 424 is equal to one, then the first stage, second stage and third stage result messages 950 are shown in FIG. 10A. The first stage result message 952 which corresponds to 426 in FIG. 4, shows that there are outputs for all three Fields A, B and C. This is because all three fields A, B and C have data capture priority values which are greater than or equal to the threshold value of one. It is seen that field A is accurately recognized and Fields B and C are not accurately recognized. Then in accordance with the flow diagram of FIGS. 8A, 8B and 8C, the second stage character recognition processor 414 will not analyze Field A again since it was accurately recognized in the first stage processor 412. However, the second stage processor 414 will perform character recognition operations on Fields B and C, because both Fields B and C have priority values which are greater than or equal to the threshold value of one, and they also have misrecognized characters or errors in the first stage result message 426 or 952 of FIG. 10A. The second stage result message output from the second stage character recognition processor 414, which is shown as 428 in FIG. 4 and 954 in FIG. 10A, indicates that Field B was accurately recognized and Field C still has an error. The second stage result message 954 is then passed to the third stage processor 416. The third stage processor 416, in accordance with the flow diagram of FIG. 8C, will not analyze Fields A and B, since they no longer have errors or misrecognized characters in the second stage result message 954. Field C will be analyzed since it has a priority value which is greater than or equal to the threshold value of one, and it also contains residual errors from the first and second stage character recognition operations. The third stage processor 416 performs its recognition operation on Field C and outputs a correct character string as is shown in the third stage result message 956 of FIG. 10A.

The second example shown in FIG. 10B is for a system threshold value of three which is applied by the document buffer processor 408 using the threshold message 424, to the first stage, second stage and third stage processors 412, 414 and 416, respectively. The first stage result message 962 shown in FIG. 10B, shows that Fields A and B have been skipped. It can be seen that the second stage and third stage result messages 964 and 966 also show that Fields A and B have been skipped. This is because the data capture priority value assigned to Fields A and B is less than the current threshold value of three. However, the first stage result message 962 of FIG. 10B shows that Field C has been analyzed by the first stage processor 412, and that the character recognition output contains two correct characters and two misrecognized characters. The first stage result message 962 is then passed to the second stage processor 414. The second stage processor will process Field C because its priority is greater than the threshold value and Field C contains an error. A partial correction of the character recognition string is produced by the second stage processor 414, as is seen in FIG. 10B. In the second stage result 428 or 964 of FIG. 10B is output to the third stage processor 416. The processor 416 will process Field C because its priority value is greater than the threshold value and it contains residual errors from the first stage and second stage character recognition processors 412 and 414. The third stage result message 966 shown in FIG. 10B shows that Field C has been correctly character recognized. Thus it is seen in FIG. 10B that the result messages 960 for threshold three illustrate that Fields A and B have been skipped, Field C has been passed through all of the character recognition stages 412, 414 and 416. The output of the third stage result message 966 will be applied to the third stage result buffer 418 of FIG. 4.

Thus it is seen that the invention manages the recognition of text characters in a plurality of document images in an improved manner. The invention uses a predetermined assessment of the relative importance of particular fields in the document form, to manage a throughput for character recognition processing of a plurality of such forms. The system is able to both maintain a limitation on the size of the backlogged volume of document images and maintain a desired throughput for processing documents, even though the input volume of document images to process varies.

In the above examples, it is within the scope of the invention to have other patterns of recognized character strings sent to the next stage. For example, if the threshold is low, all fields are sent to the next stage, but if the threshold is high, only fields are sent that have misrecognized or suspicious characters.

Figure 11A:
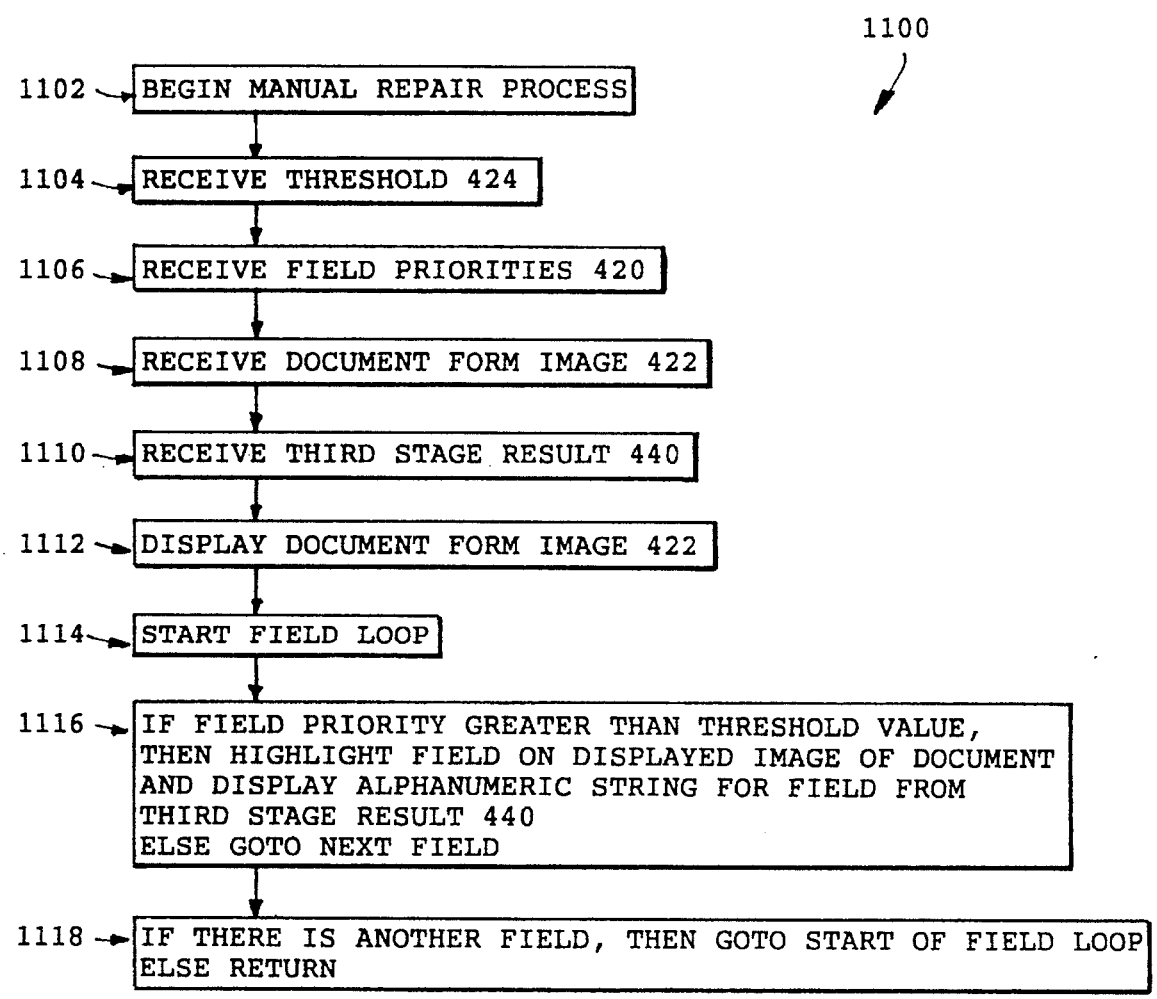
FIG. 11A is a flow diagram of the manual repair process 1100.

FIG. 4, as was discussed above, is the overall functional block diagram of the system in accordance with the invention. A feature of the invention is the provision of an adjustable threshold based upon the number of manual repair processors logged on to the local area network 400. The manual repair processor 450 and the manual repair processor 452 are connected to the LAN 400, to receive the third stage result message 440, and display the image of the document, if there have been misrecognized or suspicious characters. FIG. 11A shows the flow diagram of the manual repair process, which begins at step 1102. At step 1104, the threshold message 424 is received on the LAN 400, from the document buffer processor 408, establishing a system threshold for the manual repair processors 450 and 452. The process of FIG. 11A, ms executed in each of the manual repair processors 450 and 452. Step 1106 receives the field priorities 420 and step 1108 receives the document form image 422. The third stage OCR result 440 is received in step 1110.

Figure 11B:
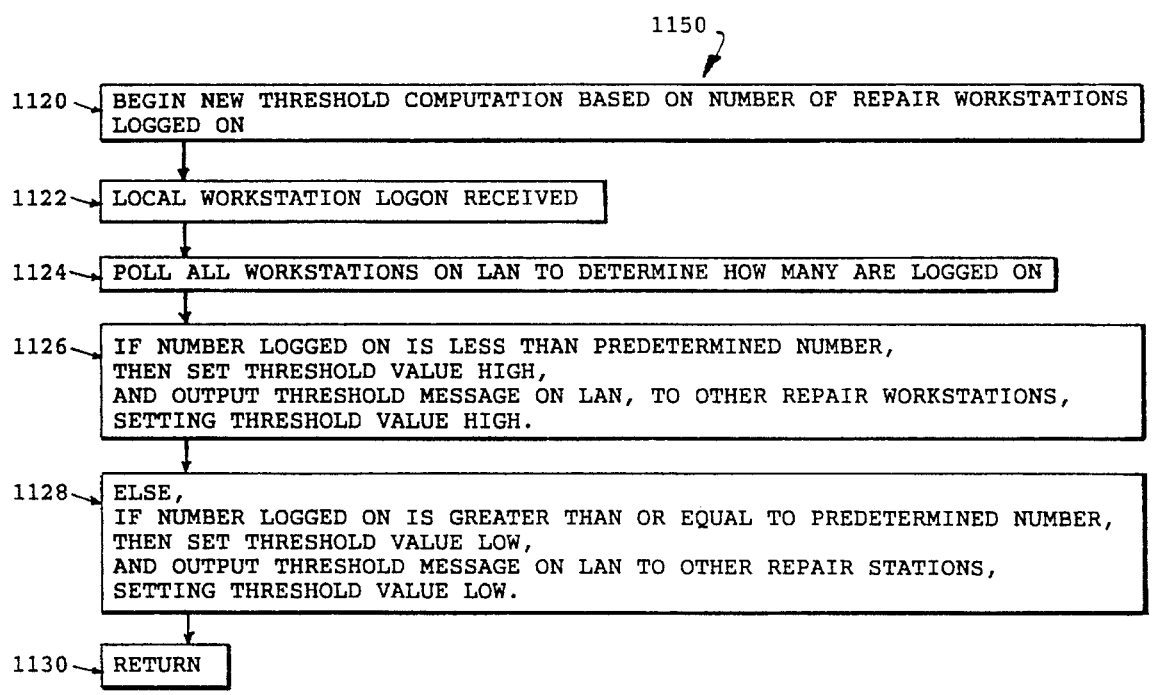
Figure 12A:
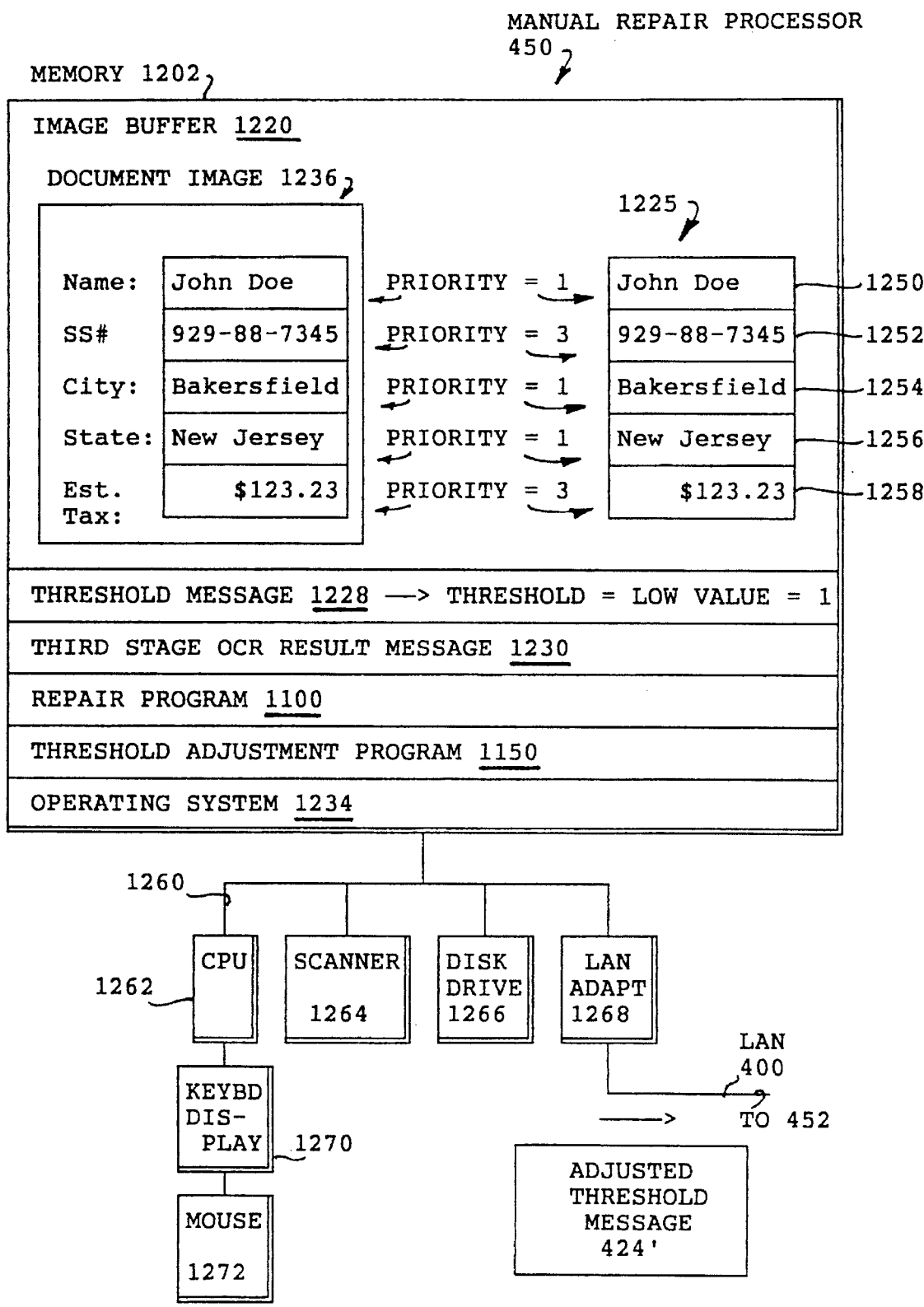
FIG. 12A is a functional block diagram of the manual repair processor 450, with the threshold equal to a low value of one.

Turning to FIGS. 12A and 12B, a functional block diagram of the manual repair processor 450 is shown. The manual repair processor 450 includes the memory 1202 which is connected by means of the bus 1260 to the CPU 1262, the scanner 1264, the disk drive 1266, the LAN adapter 1268, which is connected to the LAN 400. It is also connected to the second manual repair processor 452. Also connected to the bus 1260 is the keyboard and display 1270, and the mouse 1272. The memory 1202 includes an image buffer 1220, a threshold message buffer 1228, a third stage OCR result message buffer 1230, the repair program 1100 of FIG. 11A, the threshold adjustment program 1150 of FIG. 11B, and the operating system 1234. Programs stored in the memory 1202 are sequences are executable instructions, which, when executed in the CPU 1262, carry out the intended operations.

It is seen in the image buffer 1220 of the memory 1202, that the document image 1236 which has been received as image 422, is displayed in the image buffer 1220, for actual display on the keyboard and display 1270. The corresponding priorities of the five fields for name, SS number, city, state and estimated tax, are shown in the document image buffer 1236. It is seen that the number and the estimated tax fields have a priority of three which is higher than the priority of one attributed to the name field, the city and the state fields. Also included in the image buffer 1220, is the partition 1225 which stores the alphanumeric result strings output from the third stage OCR processor 416 and the third stage result message 430.

In accordance with the invention, if the threshold value stored in the partition 1228, is a low value, and if the priority values attributed to respective fields in the document image 1236 are equal to a greater magnitude than the threshold value, then those respective fields will be presented to the operator for manual correction. In particular, in FIG. 12A, the manual repair processor 450 is currently at a low threshold value of one. Thus the name field has the alphanumeric string 1250 displayed, the SS number field has the numeric field 1252 displayed, the city field has the alphanumeric field 1254 displayed, the state field has the alphanumeric field 1256 displayed, and the estimated tax field has the numeric field 1258 displayed. All five of those fields will be presented to the operator at the manual repair processor 450, for manual correction of misrecognized characters.

Turning now to FIG. 125, the manual repair processor 450 of FIG. 12A is shown with a threshold value set at a high value of three. It is seen that under this condition, only the high priority fields, the SS field, and the estimated tax field, are displayed in their alphanumeric forms as fields 1252 and 1258. In this manner, only high priority fields are presented to the operator for collection of misrecognized and suspicious characters output in the third stage OCR result message 440.

Turning now to resume the flow diagram of FIG. 11A, the method 1100 continues at step 1112 by displaying the document form image 422 in the document image partition 1236. Then step 1114 starts the field loop. Step 1116 determines if the field priority is greater than the threshold value. If it is, then highlight the field on the display image 1236 and display the alphanumeric string in 1225 for the field, the alphanumeric string having been obtained from the third stage result 440.

Step 1118 of FIG. 11A then determines if there is another field and if there is, then the program flows to the start of the field loop at step 1114. Alternately, the program returns to the main program.

Another feature of the invention is shown in FIG. 11B which is the threshold adjustment program 1150. Step 1120 begins the new threshold computation which is based on the number of repair workstations logged on to the LAN 400. As is shown in FIG. 4, there are two repair stations 450 and 452. At initial program load for a particular repair station 450, for example, the processor 450 will adopt the threshold established in the threshold message 422 output from the system from the document buffer processor 408. Turning back to FIG. 11B, step 1122 receives the local workstation log-on. Then step 1124 polls all other workstations on the LAN 400 to determine how many are logged on. This is carried out for example, by the process described U.S. Pat. No. 4,914,571 to Baratz, et al., entitled "Locating Resources in Computer Networks," that description incorporated herein by reference. The Baratz, et al. patent is assigned to the IBM Corporation. After the polling operation in step 1124, step 1126 determines if the number of other manual repair processors 450, 452, etc., which are logged on to the LAN 400, is less than a predetermined number. For example a predetermined number of 10 workstations may be set. If the number of logged on is less than the predetermined number, then the threshold value for the particular manual repair processor 450, is set to a high value. In this manner, only high priority fields in each document image received on the local area network 400, will be presented to the operator for repair. This increases the number of document images that can be subjected to manual repair processes in the face of a shortage of manpower in a particular work session. Step 1126 of FIG. 11B also outputs a threshold message on the LAN 400, to other repair workstations, setting the threshold at a high value. If other workstations on the network have a different threshold value, they will be uniformly be set to a high value, so that all workstations will examine only those fields on a document image having a sufficiently high priority.

Process 1150 in FIG. 11B continues with step 1128, which alternately determines if the number of logged on manual repair processors is greater than or equal to the predetermined number, for example greater than or equal to 10. If it is, then the threshold value of the logged on processor is set to a low value. In this manner, the newly logged on processor such as the manual repair processor 450, will adopt a low threshold value, thereby enabling more fields on a document image to be examined for manual repair of misrecognized character strings. Step 1128 continues by outputting a threshold message on the LAN 400 to other repair stations 452, for example, setting the threshold value low. In this manner, all repair stations can adopt a lower threshold, thereby enabling the examination of more fields on a document image having lower priorities. In this manner, the overall throughput of documents examined at the manual repair stations can be maintained at a relatively constant quantity, in face of variations in the manpower available to perform the manual repair processes.

As can be seen with reference to FIGS. 12A and 12B, the low threshold value of one set in the manual repair processor 420 of FIG. 12A, would be increased to a higher value of three, if the manual repair processor logged on and polled the local area network 400, and found that there were fewer than the predetermined number of manual repair processors logged on to the system.

In this manner, field priorities can be used in conjunction with threshold values established for manual repair processors, to maintain a relatively constant throughput for correcting misrecognized and suspicious character strings output from the character recognition stages of the system.

It will be understood that the relative value of thresholds and priorities can be inverted from the arrangement described herein. In the arrangement of priorities and thresholds described above, if the numerical value of a priority for a field is greater than or equal to the threshold value assigned, then the field will be considered for an application. If the numerical value of the priority is less than that threshold value, then the field will be ignored. The reverse of this arrangement can be employed, where it is the priority value which must be numerically less than the numerical value of the threshold, in order to carry out a particular operation. Either arrangement is equivalent and within the scope of the invention. Also, there may be any number of possible priority values and thereshold values used by the invention. In addition, a manual override can be imposed by the system administrator to select individual thresholds for respective ones of the recognition processors or manual repair processors.

Although a specific embodiment of the invention has been disclosed, it will be understood by those having skill in the art that changes can be made to the specific embodiment without departing from the spirit and the scope of the invention.

What is claimed is:

1. In a data processing system, including a document image input, a document image buffer, and a character recognition processing means, a method for managing the recognition of text characters in a plurality of document images, comprising the steps of:

storing a first field definition in said system, specifying a first location and a first data capture priority value for a first field in a document type and a second field definition in said system, specifying a second location and a second data capture priority value for a second field, which is less than said first data capture priority value, in said document type;

buffering in said document image buffer, a plurality of document images of said document type, containing text characters in said first and second fields;

counting in said system, said plurality of buffered document images in said document image buffer and sending a data capture priority threshold signal to said character recognition processing means if said plurality is greater than a predetermined value; and performing character recognition of said first and second fields with said character recognition processing means when said plurality of buffered document images is less than said predetermined value and omitting performing character recognition of said second field with said character recognition processing means in accordance with said second field definition, in response to said data capture priority threshold signal when said plurality of buffered document images is greater than said predetermined value.

2. In a data processing system, including a document image input, a document image buffer, and a character recognition processing means having a high quality recognition mode and a low quality recognition mode, a method for managing the recognition of text characters in a plurality of document images, comprising the steps of:

storing a first field definition in said system, specifying a first location and a first data capture priority value for a first field in a document type and a second field definition in said system, specifying a second location and a second data capture priority value for a second field, which is less than said first data capture priority value, in said document type;

buffering in said document image buffer, a plurality of document images of said document type, containing text characters in said first and second fields;

counting in said system, said plurality of buffered document images in said document image buffer and sending a data capture priority threshold signal to said character recognition processing means if said plurality is greater than a predetermined value; and performing character recognition of said first and second fields with said character recognition processing means using said high recognition mode when said plurality of buffered document images is less than said predetermined value and performing character recognition of said second field with said character recognition processing means using said low recognition mode in accordance with said second field definition, in response to said data capture priority threshold signal when said plurality of buffered document images is greater than said predetermined value.

3. In a data processing system, including a document image input, a document image-buffer, and a first character recognition processing means and a second character recognition processing means, a method for managing the recognition of text characters in a plurality of document images, comprising the steps of:

storing a first field definition in said system, specifying a first location and a first data capture priority value for a first field in a document type and a second field definition in said system, specifying a second location and a second data capture priority value for a second field, which is less than said first data capture priority value, in said document type;

buffering in said document image buffer, a plurality of document images of said document type, containing text characters in said first and second fields;

counting in said system, said plurality of buffered document images in said document image buffer and sending a data capture priority threshold signal to said character recognition processing means if said plurality is greater than a predetermined value; and performing character recognition of said first and second fields with both said first character recognition processing means and said second character recognition processing means when said plurality of buffered document images is less than said predetermined value and omitting performing character recognition of said second field with said first character recognition processing means and said second character recognition processing means in accordance with said second field definition, in response to said threshold signal when said plurality of buffered document images is greater than said predetermined value.

4. In a data processing system, including a document image input, a document image buffer, and a first character recognition processing means and a second character recognition processing means, a method for managing the recognition of text characters in a plurality of document images, comprising the steps of:

storing a first field definition in said system, specifying a first location and a first data capture priority value for a first field in a document type and a second field definition in said system, specifying a second location and a second data capture priority value for a second field, which is less than said first data capture priority value, in said document type;

buffering in said document image buffer, a plurality of document images of said document type, containing text characters in said first and second fields;

counting in said system, said plurality of buffered document images in said document image buffer and sending a data capture priority threshold signal to said character recognition processing means if said plurality is greater than a predetermined value; and performing character recognition of said first and second fields with both said first character recognition processing means and said second character recognition processing means when said plurality of buffered document images is less than said predetermined value and omitting performing character recognition of said second field with said second character recognition processing means in accordance with said second field definition, in response to said threshold signal when said plurality of buffered document images is greater than said predetermined value.

5. A data processing system for managing the recognition of text characters in a plurality of document images, comprising:

a storage means, for storing a first field definition specifying a first location and a first data capture priority value for a first field in a document type and a second field definition specifying a second location and a second data capture priority value for a second field, which is less than said first data capture priority value, in said document type;

a document image buffer, for buffering a plurality of document images of said document type, containing text characters in said first and second fields;

a counting means coupled to said document image buffer, for counting said plurality of buffered document images therein and providing a data capture priority threshold signal if said plurality is greater than a predetermined value; and a character recognition processing means coupled to said storage means, to said document image buffer and to said counting means, for performing character recognition of said first and second fields when said plurality of buffered document images is less than said predetermined value and omitting performing character recognition of said second field in accordance with said second field definition, in response to said threshold signal when said plurality of buffered document images is greater than said predetermined value.

6. In a data processing system, including a document image input, a document image buffer, a character recognition processing means, and a manual character repair processor, a method for managing the correction of text characters output from said recognition processing means, comprising the steps of:

receiving a data capture priority threshold value in said repair processor;

receiving a document form image, field character recognition results from a particular document, and field priorities, said field priorities including data capture priority values, in said repair processor;

displaying said particular document image on a display device at said repair processor;

selectively displaying a first character recognition string for a first field requiring correction said particular document image at said repair processor, if the first data capture priority value for said first field is greater than said data capture priority threshold;

selectively omitting display of a second character recognition string for a second field requiring correction in said particular dochunent image at said repair processor, if a second data capture priority value for said second field is less than said data capture priority threshold;

polling a plurality of other repair processors coupled to said repair processor, to determine how many of said other repair processors are logged on; and increasing said data capture priority threshold value if there are fewer than a predetermined number of said other repair processors are logged on.

7. The method of claim 6, which further comprises:

sending a data capture priority threshold message to said other repair processors, increasing said data capture priority threshold value.

8. The method of claim 6, which further comprises:

decreasing said data capture priority threshold value if there are more than a predetermined number of said other repair processors logged on.

9. The method of claim 8, which further comprises:

sending a data capture priority threshold message to said other repair processors, decreasing said data capture priority threshold value.

* * * * *